United States Patent
Yamamoto

(10) Patent No.: US 7,076,688 B2
(45) Date of Patent: Jul. 11, 2006

(54) FAILURE INFORMATION MANAGEMENT METHOD AND MANAGEMENT SERVER IN A NETWORK EQUIPPED WITH A STORAGE DEVICE

(75) Inventor: Masayuki Yamamoto, Sagamihara (JP)

(73) Assignee: Hiatchi, Ltd., Tokyo (JP)

( * ) Notice: Subject to any disclaimer, the term of this patent is extended or adjusted under 35 U.S.C. 154(b) by 374 days.

(21) Appl. No.: 10/659,362

(22) Filed: Sep. 11, 2003

(65) Prior Publication Data
US 2005/0015685 A1 Jan. 20, 2005

(30) Foreign Application Priority Data
Jul. 2, 2003 (JP) ............... 2003-189954

(51) Int. Cl.
G06F 11/00 (2006.01)
(52) U.S. Cl. ............... 714/6; 714/5; 714/42; 714/43; 714/44; 714/48
(58) Field of Classification Search ............... 714/5, 714/42, 43, 44, 48
See application file for complete search history.

(56) References Cited

U.S. PATENT DOCUMENTS

| | | | |
|---|---|---|---|
| 6,253,240 B1 * | 6/2001 | Axberg et al. | 709/223 |
| 6,457,139 B1 | 9/2002 | D'Errico et al. | |
| 6,671,776 B1 | 12/2003 | DeKoning | |
| 6,697,924 B1 | 2/2004 | Swank | |
| 6,854,035 B1 | 2/2005 | Dunham et al. | |
| 6,889,345 B1 * | 5/2005 | Sicola et al. | 714/43 |
| 6,892,264 B1 | 5/2005 | Lamb | |
| 6,920,494 B1 | 7/2005 | Heitman et al. | |
| 6,952,698 B1 | 10/2005 | Delaire et al. | |
| 2001/0047482 A1 | 11/2001 | Harris et al. | |
| 2001/0054093 A1 | 12/2001 | Iwatani | 709/223 |
| 2002/0103889 A1 | 8/2002 | Markson et al. | |
| 2003/0093509 A1 | 5/2003 | Li et al. | |

(Continued)

FOREIGN PATENT DOCUMENTS

EP 1 115 225 A2 7/2001

(Continued)

OTHER PUBLICATIONS

Richard Barker, et al., "Managing SANs", Storage Area Network Essentials, John Wiley & Sons, Inc., Chapter 12, pp. 331-335.

(Continued)

Primary Examiner—Robert Beausoliel
Assistant Examiner—Joseph D Manoskey
(74) Attorney, Agent, or Firm—Mattingly, Stanger, Malur & Brundidge, P.C.

(57) ABSTRACT

Failure investigation in a SAN providing virtual volumes requires a high degree of knowledge from the SAN administrator, who also evaluates the relative severities of failure events from different devices. The SAN manager obtains information from management agents in the devices. Using this information, the SAN manager manages the association between the server and the virtual volumes and the real volumes. The SAN manager receives failure messages from multiple devices and uses the association and a failure analysis dictionary table to determine the contents of the failure messages and associations between failure messages. Failures that are causal failure are displayed. The SAN manager is equipped with a conversion table for converting failure messages issued from different storage devices to a common severity. When a failure message is received, a notification is sent to a high-level program and to an administrator based on the common severity defined in the conversion table.

34 Claims, 18 Drawing Sheets

U.S. PATENT DOCUMENTS

| | | |
|---|---|---|
| 2003/0093567 A1 | 5/2003 | Lolayekar et al. |
| 2003/0126518 A1* | 7/2003 | Binger .................. 714/48 |
| 2003/0145041 A1 | 7/2003 | Dunham et al. |
| 2003/0146929 A1 | 8/2003 | Baldwin et al. |
| 2003/0149695 A1 | 8/2003 | Delaire et al. |
| 2003/0149752 A1 | 8/2003 | Baldwin et al. |
| 2003/0149753 A1 | 8/2003 | Lamb |
| 2003/0149761 A1 | 8/2003 | Baldwin et al. |
| 2003/0149762 A1 | 8/2003 | Knight et al. |
| 2003/0149763 A1 | 8/2003 | Heitman et al. |
| 2003/0149769 A1 | 8/2003 | Axberg et al. |
| 2003/0149770 A1 | 8/2003 | Delaire et al. |
| 2003/0149795 A1 | 8/2003 | Lamb et al. |
| 2003/0154267 A1 | 8/2003 | Camacho et al. |
| 2003/0154271 A1 | 8/2003 | Baldwin et al. |
| 2003/0167327 A1 | 9/2003 | Baldwin et al. |
| 2003/0172239 A1 | 9/2003 | Swank |
| 2003/0177168 A1 | 9/2003 | Heitman et al. |
| 2003/0179227 A1 | 9/2003 | Ahmad et al. |
| 2003/0182422 A1 | 9/2003 | Bradshaw et al. |
| 2003/0191904 A1 | 10/2003 | Iwami et al. |
| 2003/0204597 A1 | 10/2003 | Arakawa et al. |
| 2003/0208589 A1 | 11/2003 | Yamamoto |
| 2003/0229645 A1 | 12/2003 | Mogi et al. |
| 2004/0049572 A1 | 3/2004 | Yamamoto et al. |
| 2004/0054648 A1 | 3/2004 | Mogi et al. |
| 2004/0061701 A1 | 4/2004 | Arquie et al. |
| 2004/0068561 A1 | 4/2004 | Yamamoto et al. |
| 2004/0103244 A1 | 5/2004 | Fujimoto et al. |
| 2004/0221105 A1 | 11/2004 | Fujimoto et al. |
| 2005/0055428 A1 | 3/2005 | Terai et al. |

FOREIGN PATENT DOCUMENTS

| | | |
|---|---|---|
| GB | 2 351 375 A | 12/2000 |
| JP | 2001-63063 | 3/2001 |
| JP | 2001-143367 | 5/2001 |
| JP | 2001-249856 | 9/2001 |
| JP | 2002-63063 | 2/2002 |
| JP | 2002063063 A * | 2/2002 |

OTHER PUBLICATIONS

"SCALAR i2000", <http://www.trisys.co.uk/downloads/adic/Scalar_i2000_Data_Sheet.pdf>.

Vanel, L. et al, "AIX Logical Volume Manager, from A to Z: Introduction and Concepts", IBM, International Technical Support Organization, SG24-5432-00, pp. i-ii, 39, 40-42, 74, 124.

Hirao, T. et al, "Resource Management", FUJITSU Sci. Tech. J., vol. 40, Jun. 2004, pp. 123-132.

* cited by examiner

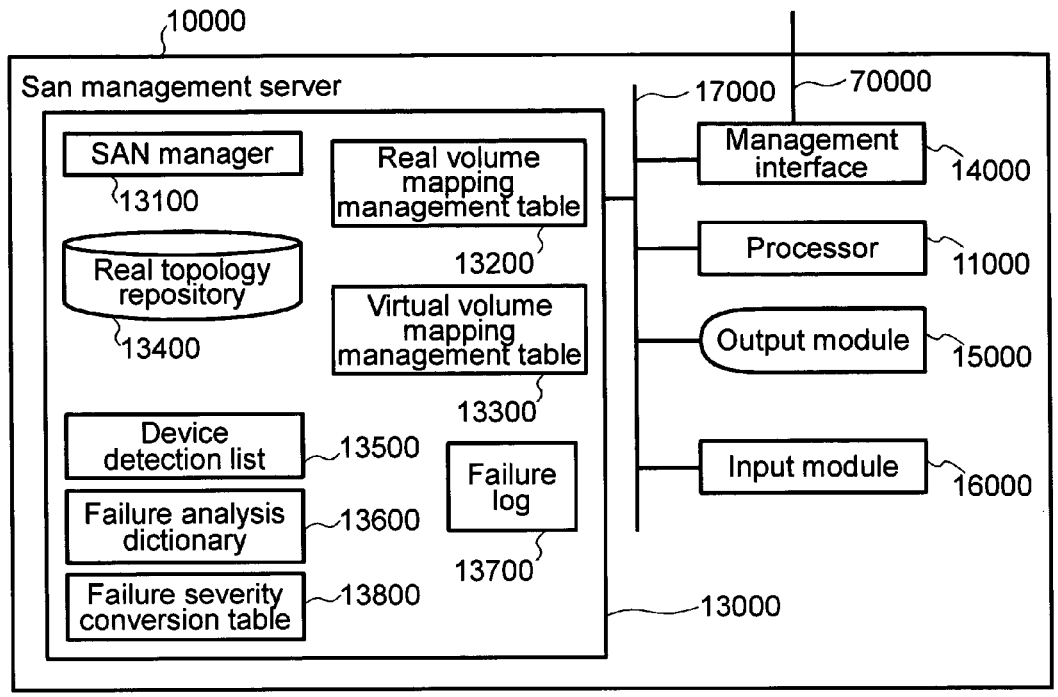
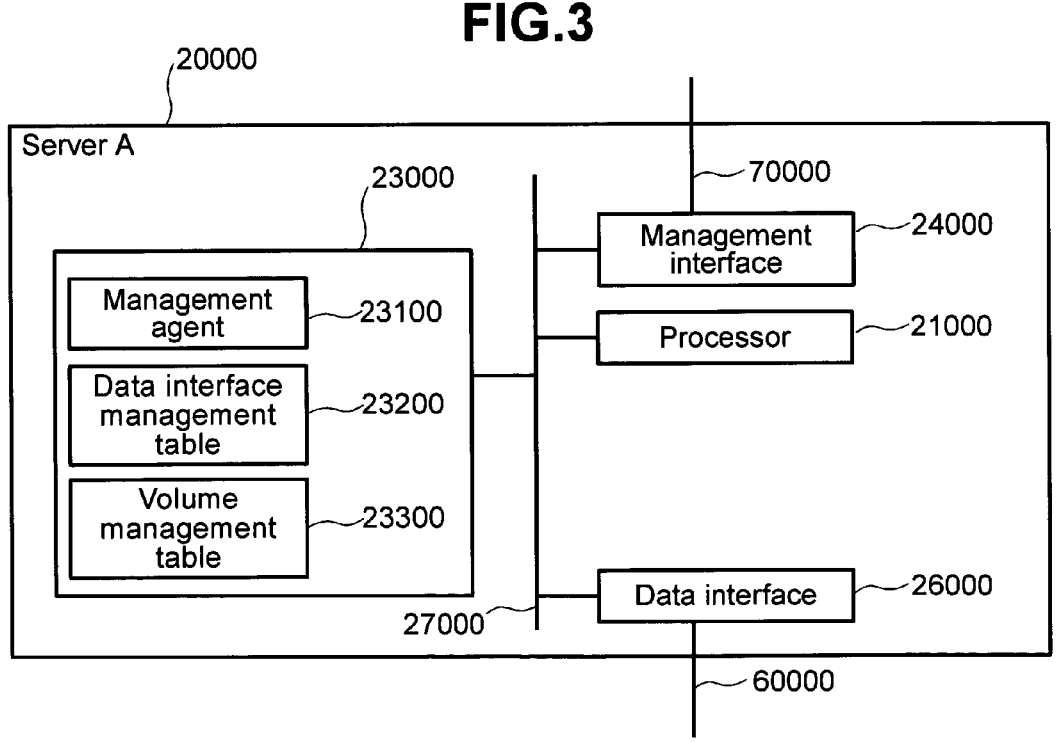

FIG. 7

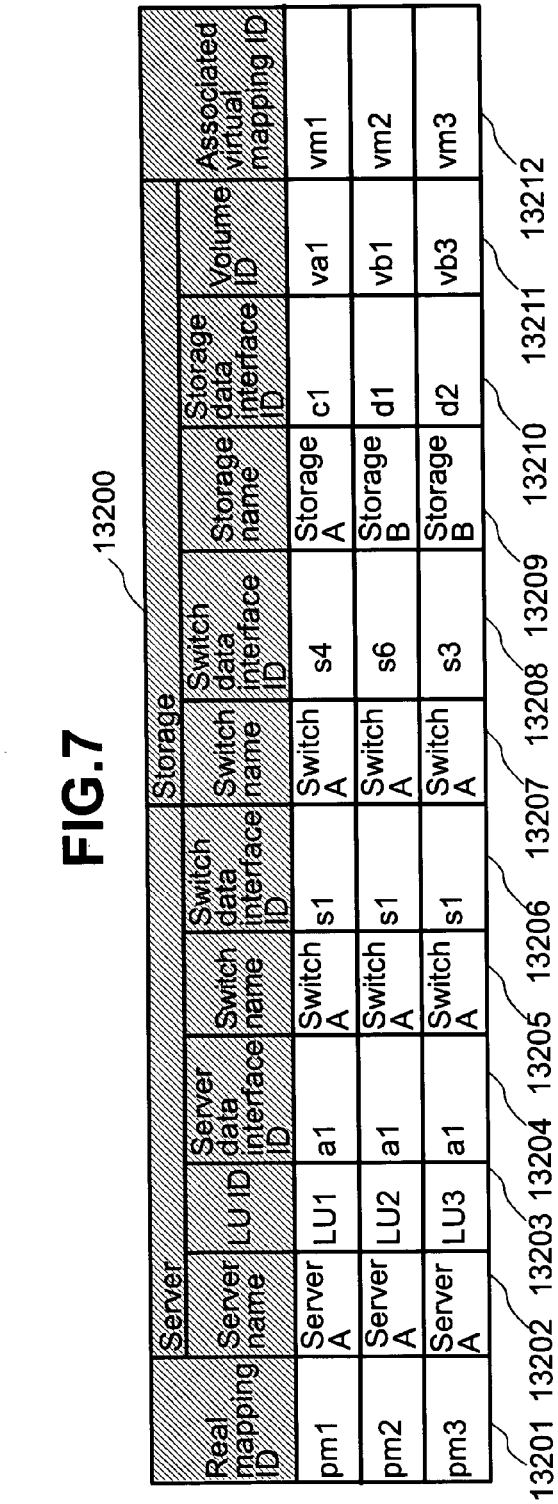

Table 13200:

| Real mapping ID | Server name | Server LU ID | Server data interface ID | Switch name | Switch data interface ID | Switch name | Switch data interface ID | Storage name | Storage data interface ID | Volume ID | Associated virtual mapping ID |
|---|---|---|---|---|---|---|---|---|---|---|---|
| pm1 | Server A | LU1 | a1 | Switch A | s1 | Switch A | s4 | Storage A | c1 | va1 | vm1 |
| pm2 | Server A | LU2 | a1 | Switch A | s1 | Switch A | s6 | Storage B | d1 | vb1 | vm2 |
| pm3 | Server A | LU3 | a1 | Switch A | s1 | Switch A | s3 | Storage B | d2 | vb3 | vm3 |

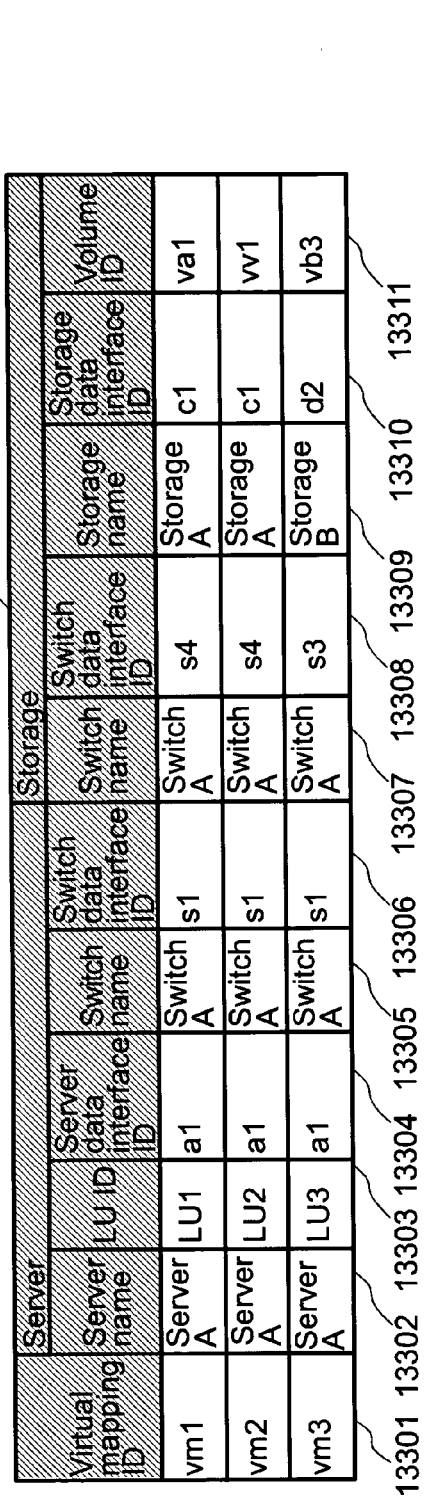

Table 13300:

| Virtual mapping ID | Server name | LU ID | Server data interface ID | Switch name | Switch data interface ID | Switch name | Switch data interface ID | Storage name | Storage data interface ID | Volume ID |
|---|---|---|---|---|---|---|---|---|---|---|
| vm1 | Server A | LU1 | a1 | Switch A | s1 | Switch A | s4 | Storage A | c1 | va1 |
| vm2 | Server A | LU2 | a1 | Switch A | s1 | Switch A | s4 | Storage A | c1 | vv1 |
| vm3 | Server A | LU3 | a1 | Switch A | s1 | Switch A | s3 | Storage B | d2 | vb3 |

| Detection ID | Device type | Device information | IP address | Volume virtualization function | virtualization ID |
|---|---|---|---|---|---|
| 1 | Server | Vendor A, Server A | 100.100.100.100 | N | N/A |
| 2 | Switch | Vendor B, Switch A | 100.100.100.101 | N | N/A |
| 3 | Storage | Vendor C, Storage A | 100.100.100.102 | Y | N/A |
| 4 | Storage | Vendor D, Storage B | 100.100.100.103 | N | 3 |

| Data interface ID | Port WWN | SCSI ID |
|---|---|---|
| a1 | WWNa1 | 2 |

| LU ID | Data interface ID | SCSI ID | LUN | Volume information |
|---|---|---|---|---|
| LU1 | a1 | 2 | 1 | Vendor C, Storage A, va1 |
| LU2 | a1 | 2 | 2 | Vendor C, Storage A, vv1 |
| LU3 | a1 | 2 | 3 | Vendor D, Storage B, vb3 |

| Data interface ID | Switch Port WWN | Target Port WWN |
|---|---|---|
| s1 | WWNs1 | WWNa1 |
| s2 | WWNs2 | N/A |
| s3 | WWNs3 | WWNd2 |
| s4 | WWNs4 | WWNc1 |
| s5 | WWNs5 | WWNc2 |
| s6 | WWNs6 | WWNd1 |

| Data interface ID | Port WWN |
|---|---|
| c1 | WWNc1 |
| c2 | WWNc2 |

(b) 53200

| Data interface ID | Port WWN |
|---|---|
| d1 | WWNd1 |
| d2 | WWNd2 |

| Real Volume ID | Path availability | Data Interface ID | SCSI ID | SCSI LUN |
|---|---|---|---|---|
| va1 | Y | c1 | 2 | 1 |
| va2 | N | N/A | N/A | N/A |

(b) 53300

| Real Volume ID | Path availability | Data Interface ID | SCSI ID | SCSI LUN |
|---|---|---|---|---|
| vb1 | Y | d1 | 4 | 1 |
| vb2 | Y | d1 | 4 | 2 |
| vb3 | Y | d2 | 2 | 3 |

| Virtual volume ||||| Real volume ||||
|---|---|---|---|---|---|---|---|---|
| Virtual volume ID | Path | Data interface ID | SCSI ID | LUN | Real data interface ID | SCSI ID | LUN | Real volume information |
| vv1 | Y | c1 | 2 | 2 | c2 | 4 | 1 | Storage B, vb1 |
| vv2 | N | N/A | N/A | N/A | c2 | 4 | 2 | Storage B, vb2 |

| Failure code | Failure component | Identifier | Cause | Severity |
|---|---|---|---|---|
| 30c1 | data interface | c1 | data interface malfunction | 1 |
| 30c2 | data interface | c2 | data interface malfunction | 1 |
| 31c1 | data interface | c1 | Destination access error | 4 |
| 31c2 | data interface | c2 | Target access error | 4 |
| 40vv1 | volume | vv1 | Volume access error | 2 |
| 40vv2 | volume | vv2 | Volume access error | 2 |
| ... | ... | ... | ... | ... |

(b) 13600

| Failure code | Failure component | Identifier | Cause | Severity |
|---|---|---|---|---|
| DATAIFd1 | data interface | d1 | data interface malfunction | 1 |
| Battery1 | Battery | Battery1 | Battery malfunction | 4 |
| ... | ... | ... | ... | ... |

(c) 13600

| Failure code | Failure component | Identifier | Cause | Severity |
|---|---|---|---|---|
| volvv1 | volume | vv1 | volume access error | 1 |
| volvv2 | volume | vv1 | volume access error | 1 |
| ... | ... | ... | ... | ... |

(d) 13600

| Failure code | Failure component | Identifier | Cause | Severity |
|---|---|---|---|---|
| Port-s6-Link | data interface | s6 | Target access error | 8 |
| Port-s5-Hard | data interface | s5 | data interface malfunction | 1 |
| ... | ... | ... | ... | ... |

| Event ID | Time | Failure device | Failure code | Real volume | Virtual volume | Event relation ship |
|---|---|---|---|---|---|---|
| ... | ... | ... | ... | ... | ... | ... |
| 1000 | 2003/01/01 13:10:10 | Storage B | DATAIFd1 | pm2 | vm2 | Parent Event |
| 1001 | 2003/01/01 13:10:20 | Storage A | 40vv2 | pm2 | vm2 | Child Event |
| 1002 | 2003/01/01 13:10:30 | Server A | Volvv2 | pm2 | vm2 | Child Event |
| 1003 | 2003/01/01 13:10:35 | Switch A | Port-s6-Link | pm2 | vm2 | Child Event |
| ... | ... | ... | ... | ... | ... | ... |
| 2000 | 2003/01/02 02:00:00 | Storage B | Battery1 | pm2 | vm2 | Parent Event |
| ... | ... | ... | ... | ... | ... | ... |
| 3000 | 2003/01/03 00:10:10 | Storage A | 31c2 | pm2 | vm2 | Child Event |
| 3001 | 2003/01/03 00:10:20 | Storage A | 40vv2 | pm2 | vm2 | Child Event |
| 3002 | 2003/01/03 00:10:30 | Server A | Volvv2 | pm2 | vm2 | Child Event |
| 3003 | 2003/01/03 00:10:35 | Switch A | Port-s5-Hard | pm2 | vm2 | Parent Event |
| ... | ... | ... | ... | ... | ... | ... |

| Common Severity | Storage A Severity | Storage B Severity | Action |
|---|---|---|---|
| 1 | 1 | 1 | Send trap and e-mail with information about Storage A and Storage B |
| 2 | 2 | 2, 3 | Send trap and e-mail with information about Storage A and Storage B |
| 3 | 3 | 4, 5, 6 | Send trap and e-mail with information about Storage A |
| 4 | 4, 5 | 7, 8, 9, 10 | Send trap with information about Storage A |

FIG.25
(a) SNMP Trap message format
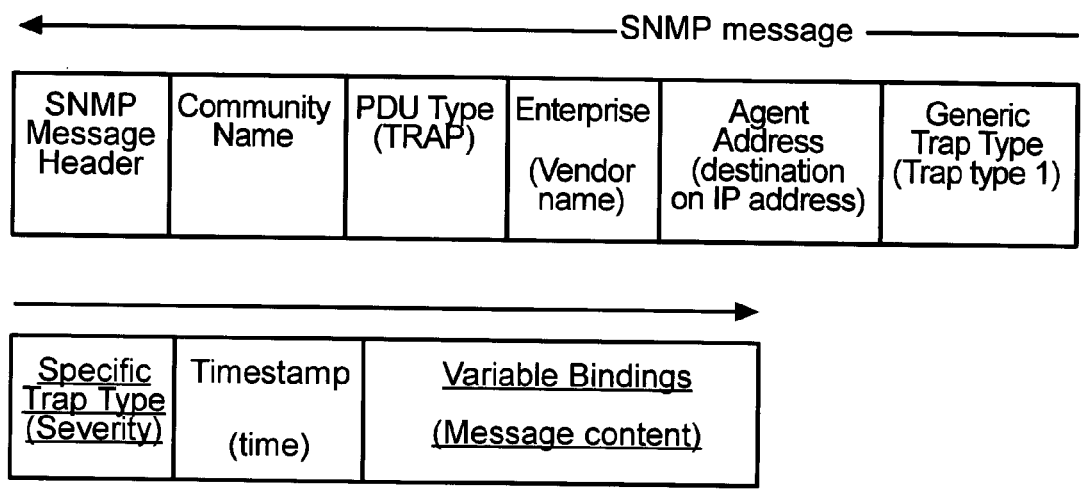
(b) Sample SNMP Trap message sent by storage device A
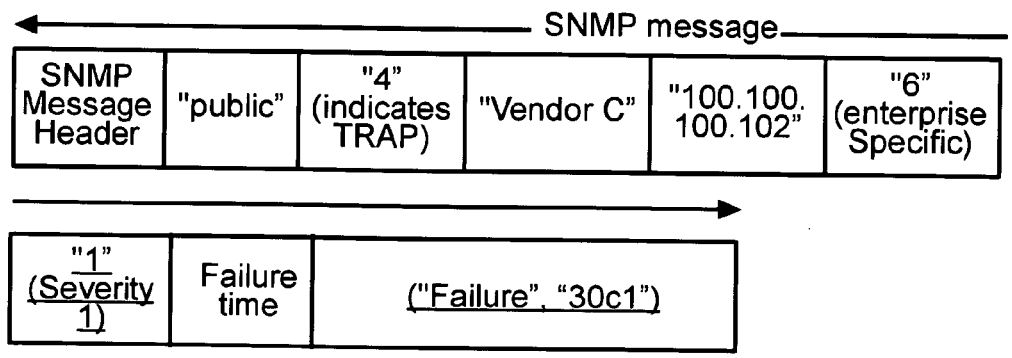

FAILURE INFORMATION MANAGEMENT METHOD AND MANAGEMENT SERVER IN A NETWORK EQUIPPED WITH A STORAGE DEVICE

BACKGROUND OF THE INVENTION

The present invention relates to a computer system that is equipped with a storage system. More specifically, the present invention relates to a method and device for managing storage system failures in storage area networks (Storage Area Network, hereinafter referred to as a SAN) in which real volumes from a storage system are provided by a server as virtual volumes.

(1) SANs

In recent years, the use of SANs has become more widespread. A SAN is a network dedicated to data storage in which the storage is consolidated and separated from servers in the system. The deployment of SANs makes it possible to provide high-speed data transfer, high scalability and availability in a storage system, as well as efficient usage of storage resources.

(2) SAN Management

The high scalability of SAN-based storage systems allows devices (servers, switches, storage devices) from multiple vendors to be mixed in a SAN. Using a SAN without disruption requires SAN management.

An overview of SAN management is described in p. 331–334 of "Storage Area Network Essentials", by Richard Barker and Paul Massiglia (John Wiley & Sons, Inc.). In SAN management, the monitoring of the availability of devices connected in the SAN is especially important and is the basis of day-to-day operation of the system. The software used for monitoring SAN availability is hereinafter referred to as the SAN manager. A SAN manager has two major functions: configuration management and failure monitoring.

In the configuration management function, information is periodically obtained from a management agent present in each device that is connected in the SAN, the physical connections (topology) of the SAN are determined from the obtained information, and an up-to-date topology is continuously visualized and provided to the user of the SAN manager, i.e., the SAN administrator.

In failure monitoring, event notifications issued from devices connected in the SAN, e.g., notifications of hardware failure or performance decreases, and device information periodically obtained from the management agent present in each device are used to detect events, such as failures and performance drops, and these events are communicated to the SAN administrator.

With these two functions, the SAN administrator is able to use the SAN manager to provide unified management over availability, thus allowing a reduction in operating costs, e.g., by reducing the number of SAN administrators.

(3) Virtualization Devices

Virtual volumes technology is a SAN storage management technology. Virtual volume technology is disclosed in U.K. laid-open patent application number 2351375, which discloses a device referred to as a storage server that has the following two functions.

1) A function of managing a volume (hereinafter referred to as a real volume), which is a storage region in a storage medium in a storage device connected to the storage server, and for generating a volume pool.

2) A function of generating a virtual volume from at least one real volume in a volume pool, sequentially converting virtual volume I/O requests from the server to real volume I/O requests, and responding to the I/O requests from the server.

The device having these two functions will be referred to hereinafter as a storage virtualization device. By using a virtualization device in a SAN, volume allocations to the server can be centralized using virtual volumes, thus eliminating the need to be aware of the physical arrangement of the storage devices connected to the virtualization device. In other words, the SAN administrator can allocate volumes in a centralized manner.

SUMMARY OF THE INVENTION

With the failure monitoring function of the SAN manager, the SAN administrator identifies the device and component that is causing a failure based on events issued from multiple devices. This will be referred to hereinafter as "failure investigation". By having the virtualization device provide virtual volumes, a greater degree of freedom is possible for the configuration of volumes provided to the server. However, investigating a failure based on failure messages (SNMP Traps and the like) issued by devices from multiple vendors connected to the SAN depends on the SAN administrator having a high degree of knowledge about individual devices. This increases management costs.

Also, the SAN manager performs a failure notification function which performs event notification to management software managing the overall enterprise system (hereinafter referred to as the high-level system management software), sending e-mail to the SAN administrator, and the like, depending on the severity of the failure. However, since the definition of the severity of a failure is dependent on the individual devices connected to the SAN, for each failure, the SAN administrator must judge whether a particular event from a particular device has a high severity. Thus, responding to a failure becomes time consuming.

A first object of the present invention is to support failure investigation by the SAN administrator when a failure message is issued from a device connected to the SAN.

A second object of the present invention is to allow the SAN administrator and high-level system management software to receive, out of the failure messages issued by the devices connected to the SAN, the failure information that is necessary.

To achieve the first object, a management server, which receives multiple failure notifications from devices connected to a SAN, associates and outputs multiple failure notifications based on association relationships between real volumes and virtual volumes managed by the virtualization device.

To achieve the second object, a management server, which receives multiple failure notifications from devices connected to a SAN, takes information indicating the severity of failure information, based on different standards, as contained in the failure notifications, and converts this information to severity information based on a common standard, and then it processes the failure notification based on the converted severity.

BRIEF DESCRIPTION OF THE DRAWINGS

FIG. 2 is a block diagram showing an example of a SAN management server.

FIG. 3 is a block diagram showing an example of a server.

FIG. 7 is a diagram showing an example of a real volume mapping management table which is stored in a SAN management server.

FIG. 8 is a diagram showing an example of a virtual volume mapping management table which is stored in a SAN management server.

FIG. 9 is a diagram showing an example of a device detection list which is stored in a SAN management server.

FIG. 10 is a diagram showing an example of a data interface management table which is stored in a server.

FIG. 11 is a diagram showing an example of a volume management table which is stored in a server.

FIG. 12 is a diagram showing an example of a FC connection management table which is stored in a switch.

FIG. 13 is a diagram showing data interface management table which is stored in a storage device.

FIG. 14 is a diagram showing an example of a real volume management tables which is stored in a storage device.

FIG. 15 is a block diagram showing an example of a virtual volume management table which is stored in a storage device.

FIG. 16 is a diagram showing an example of a failure analysis dictionary table associated with a storage device and which is stored in a SAN management server.

FIG. 17 is a diagram showing an example of a failure log which is stored in a SAN management server.

FIG. 18 is a diagram showing an example of a failure severity conversion table which is stored in a SAN management server.

FIGS. 25(a) and 25(b) are diagrams showing the format and an example of an SNMP Trap message, respectively.

DESCRIPTION OF THE PREFERRED EMBODIMENTS

Various embodiments of the present invention will be described below, with reference to the drawings; however, the present invention is not restricted to these embodiments.

<SAN Architecture>

First, an example of the SAN architecture according to this embodiment will be described. FIG. 1 through FIG. 6 show an example of a SAN and devices connected to the SAN. FIG. 9 through FIG. 18 show management information contained in the devices.

Figure 1:
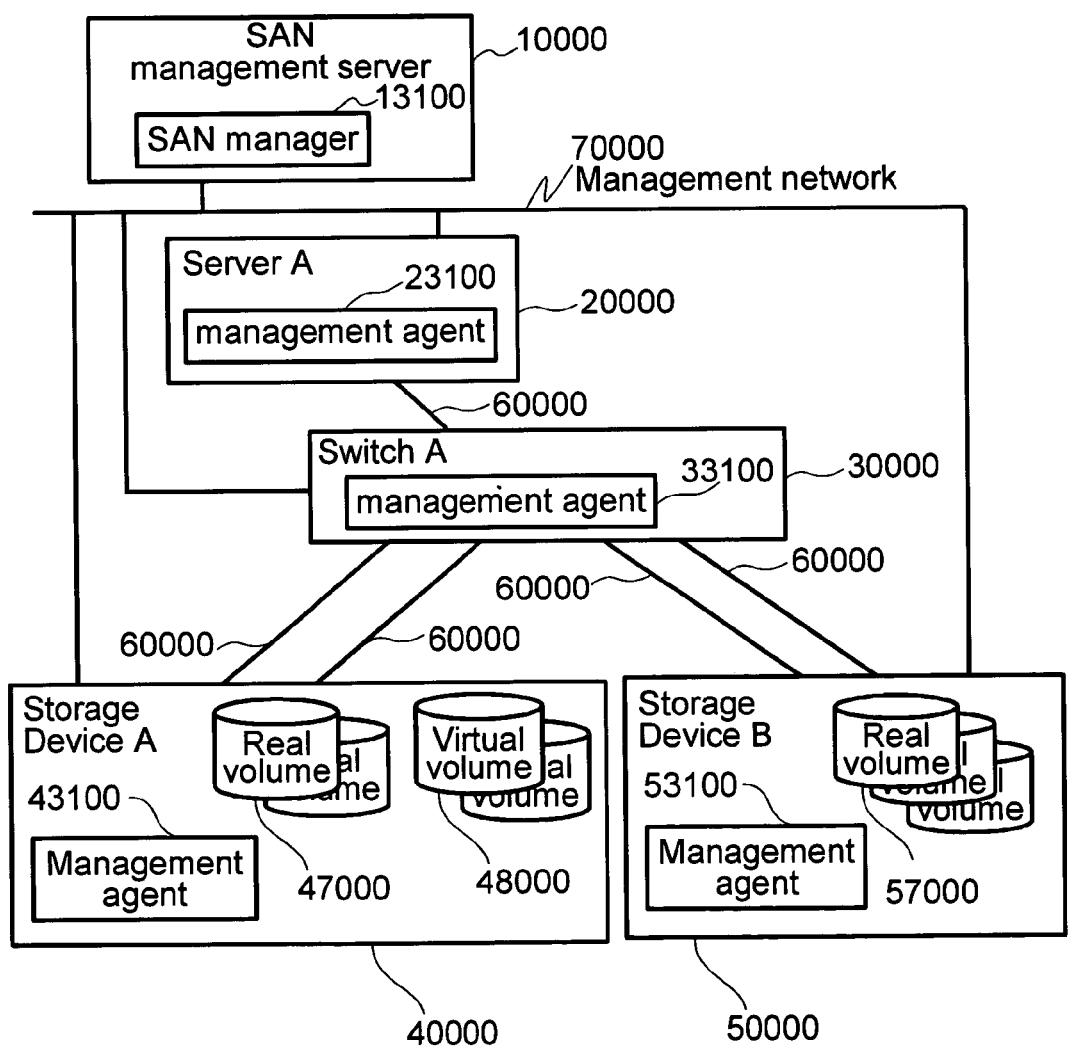
FIG. 1 is a block diagram showing an example of SAN architecture.

FIG. 1 shows an example of SAN architecture. The SAN of the present invention includes: at least one server having a management agent; at least one switch having a management agent; at least one virtualization device having a management agent; at least one storage device having a management agent; and a single SAN management server having a SAN manager.

For convenience in the following description, the SAN of this embodiment includes: a single server (server A) 20000, a single switch (switch A) 30000, a single storage device with virtual volume technology (storage device A) 40000, and a single storage device (storage device B) 50000. These elements are connected to each other by a Fibre Channel 60000. In this embodiment, the storage device A40000 recognizes a real volume 57000 of the storage device B50000 by way of the switch 30000. Using the virtual volume function of the storage device A40000, the real volume 57000 of the storage device B50000 is provided to the server as a virtual volume of the storage device A40000.

Figure 26:
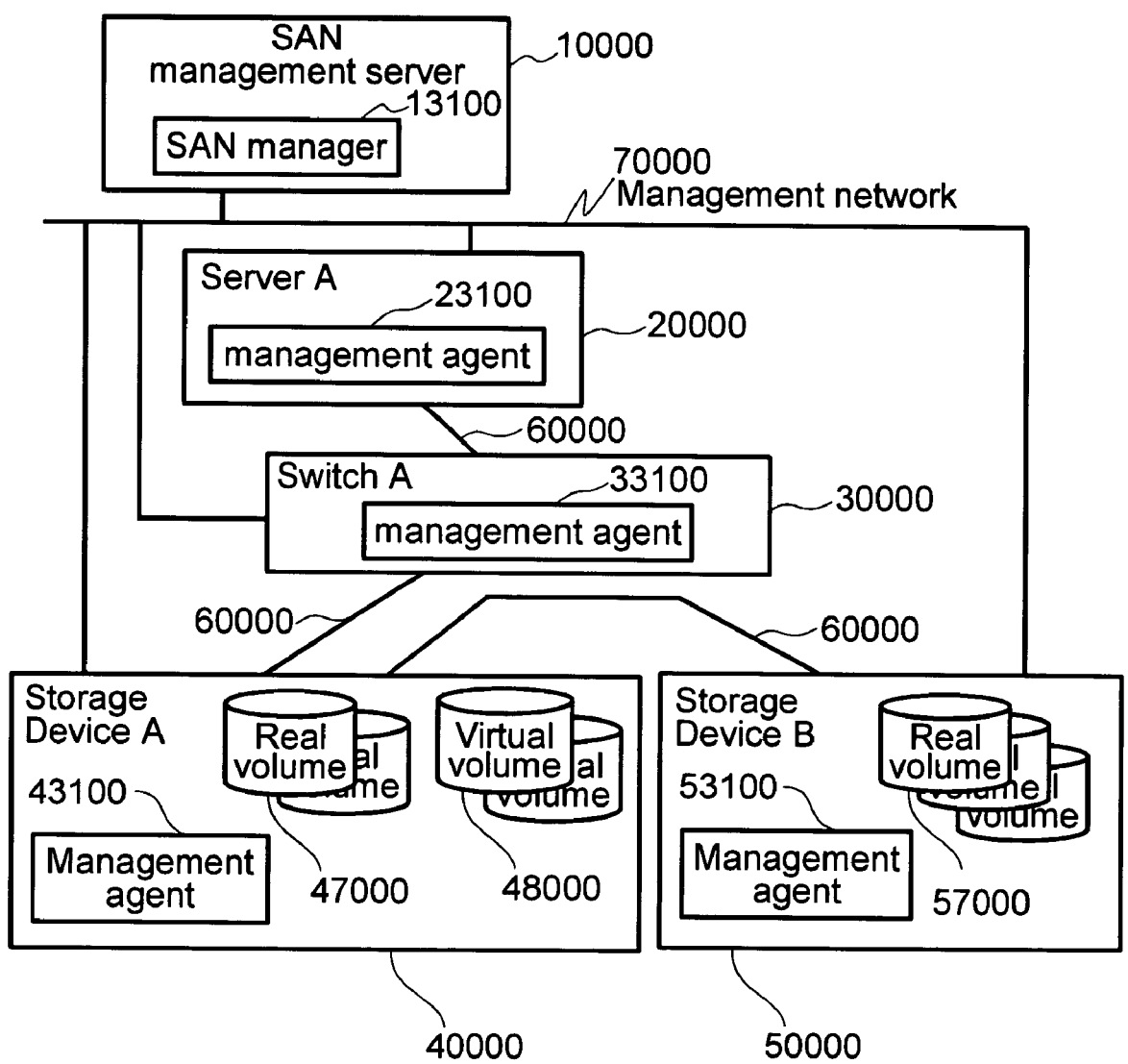
FIG. 26 is a block diagram showing an example of the configuration of a SAN.
Figure 27:
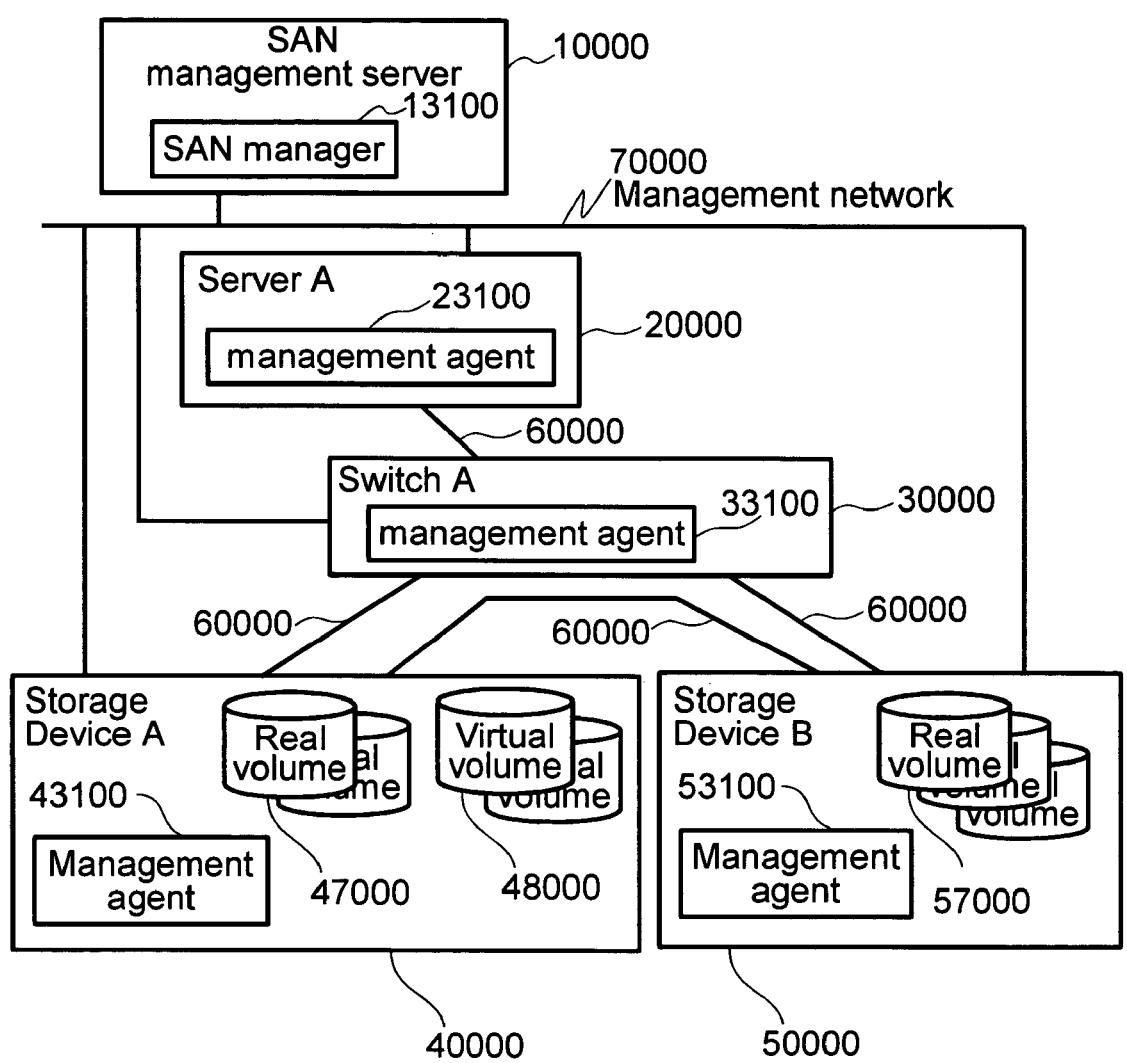
FIG. 27 is a block diagram showing an example of the configuration of a SAN.

Regarding how the storage device A40000 and the storage device B50000 are connected, this connection does not have to go through the switch A30000 as shown in the example of FIG. 1. For example, as in the second examples of SAN architecture shown in FIG. 26, the Fibre Channel 60000 can be used to directly connect the storage device A40000 and the storage device B50000. Also, as shown in the third example of SAN architecture shown in FIG. 27, there can be a combination of a path that directly connects the storage device A40000 with the storage device B50000 and a path in which the storage devices are connected by way of a switch.

A SAN management server 10000 is connected by way of a management network 70000 to the server, the switch, and the storage devices. The management agent of each device and a SAN manager 13100 in the SAN management server 10000 can communicate by way of the management network. The SAN manager 13100 performs operations to be described later to manage the configuration of virtual volumes and real volumes, to investigate failures in the SAN, and to perform failure notifications in the SAN.

Referring to FIG. 2, a memory 13000 in the SAN management server 10000 stores: a SAN manager 13100, which is a program executed by the SAN management server; a real volume mapping management table 13200 for storing real volume mapping information for the SAN; a virtual volume mapping management table 13300 for storing virtual volume mapping information for the SAN; a real topology repository 13400, which is a memory area for storing information collected from management agents in the devices in the SAN; a device detection list 13500 for storing a list of devices in the SAN to be managed by the SAN manager 13100; at least one failure analysis dictionary 13600 for analyzing failure notification message contents received from the devices in the SAN; a failure log 13700 for recording event contents; and at least one failure severity conversion table 13800, which is used to perform severity conversion, to be described later, for storing severity conversion definitions defined ahead of time by a SAN administrator.

FIG. 3 shows an example of the server 20000. The server 20000 includes: a processor 21000; a memory 23000; a management interface 24000 for connecting to the management network 70000; and at least one data interface 26000 for connecting to the Fibre Channel 60000. These elements are connected to each other by a communication path 27000, e.g., an internal bus.

The memory 23000 stores: a management agent 23100, which is a program for communicating with the SAN manager 13100 to send and receive the server's management information; a data interface management table 23200 for storing management information for the server's data interface; and a volume management table 23300 for storing management information for a volume that the server accesses.

In this embodiment, there is one server, server A, and the server A is equipped with one data interface. However, the number of servers and data interfaces is not limited to one. Multiple servers can be connected to the SAN and a single server can be equipped with multiple data interfaces. Each data interface in a server is assigned an identifier (data interface ID) that is unique within the server. In this embodiment, the data interface ID of the server A is a1.

Figure 4:
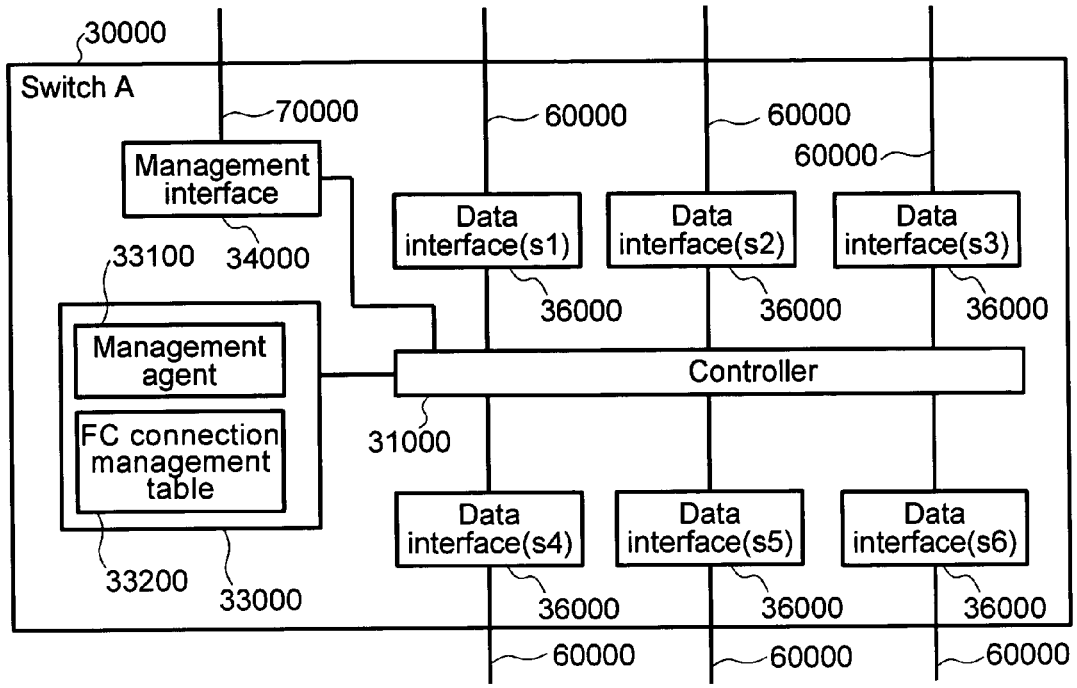
FIG. 4 is a block diagram showing an example of a switch.

FIG. 4 shows an example of the switch 30000. The switch 30000 includes: a controller 31000 performing switching of data sent to and received by way of the Fibre Channel 60000; a memory 33000; a management interface 34000 for connecting to the management network 70000; and at least one data interface 36000 for connecting to the Fibre Channel 60000. The memory 33000, the management interface 34000, and the data interface 36000 are connected to each other by the controller 31000.

The memory 33000 stores: a management agent 33100, which is a program for communicating with the SAN manager 13100 to send and receive management information for the switch A; and an FC connection management table 33200, which contains information indicating how the switches, the server, and the storage devices are connected by the Fibre Channel.

In this embodiment, there is a single switch A in the SAN, and this switch A includes six data interfaces. However, any number of switches and data interfaces can be used. Each data interface has an identifier (data interface ID) that is unique within the switch. In this embodiment, these values are s1, s2, s3, s4, s5, and s6.

Figure 5:
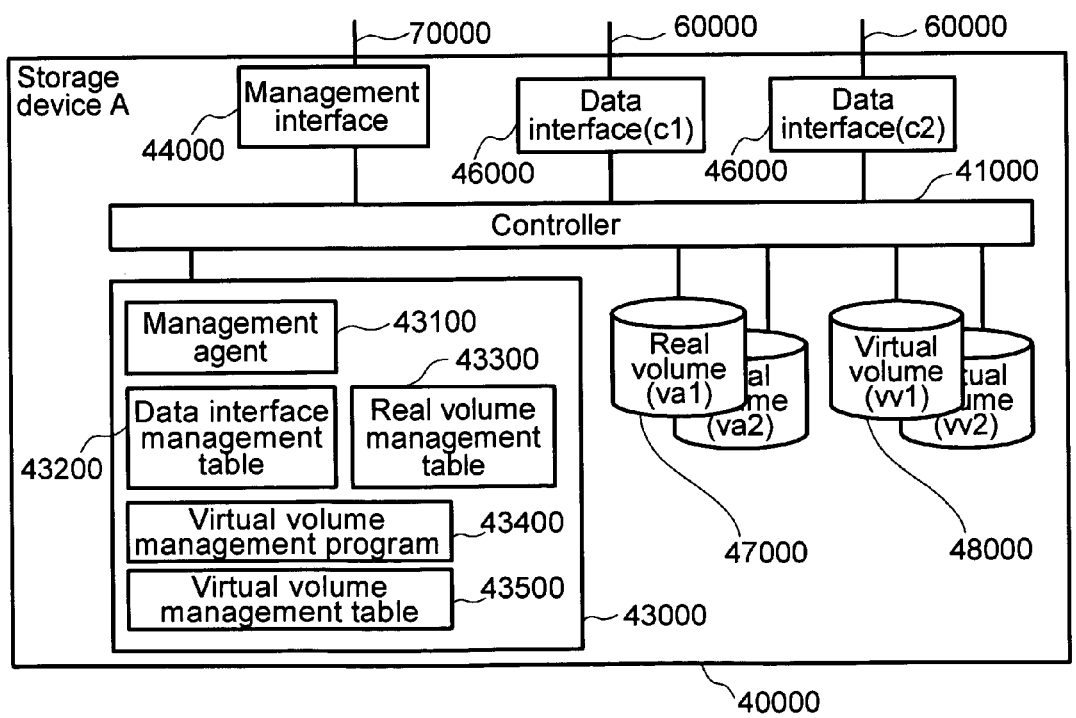
FIG. 5 is a block diagram showing an example of a storage device having a storage virtualization function.

FIG. 5 shows an example of the storage device A, which is a storage device with the virtual volume technology. The storage device A 40000 includes: a controller 41000 providing internal control for the storage device; a memory 43000; a management interface 44000 for connecting to the management network 70000; at least one data interface 46000 for connecting to the Fibre Channel 60000; and at least one real volume 47000, which stores data used by the server and has a storage region inside the storage device A. The memory 43000, the management interface 44000, the data interface 46000, and the real volume 47000 are connected to each other by the controller 41000.

In addition to the real volume 47000 serving as a storage region connected to the controller 41000, this example of the storage device A includes at least one virtual volume 48000. This virtual volume 48000 is a virtual entity created by the volume virtualization function of the storage device A from a real volume stored in another storage device (e.g., the storage device B 50000). The virtual volume 48000 is indicated in FIG. 5 as an element of the storage device A, since it is a storage region provided to the server as a volume of the storage device A, but the actual storage region exists in another storage device connected to the storage device A.

The memory 43000 stores: a management agent 43100, which is a program for communicating with the SAN manager 13100 to send and receive management information of the storage device A; a data interface management table 43200, which stores management information for the data interface of the storage device A; a real volume management table 43300, which stores management information for the real volume 47000 of the storage device A; a virtual volume management program 43400 for implementing the volume virtualization function; and a virtual volume management table 43500 for storing virtual volume management information provided to the servers by the storage device.

In this embodiment, the storage device A includes two data interfaces and two real volumes and two virtual volumes. However, there can be any number of data interfaces, real volumes, and virtual volumes. Each data interface, real volume, and virtual volume has an identifier (data interface ID, real volume ID, virtual volume ID) that is unique within the device. In this embodiment, the data interface IDs are c1, c2, the real volume IDs are va1, va2, and the virtual volume IDs are vv1, vv2.

Figure 6:
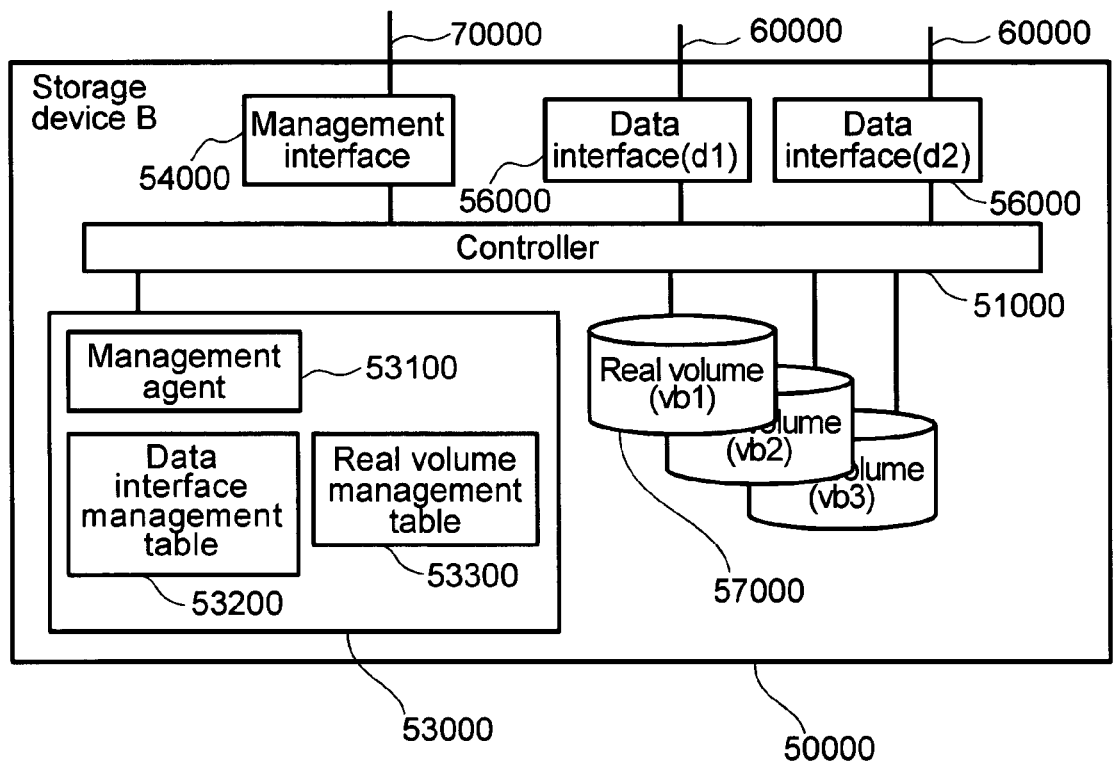
FIG. 6 is a block diagram showing an example of a storage device.

FIG. 6 shows an example of the storage device B. The storage device B has a structure similar to that of the storage device A except that there is no volume virtualization function. Thus, the memory 53000 does not contain a virtual volume management program or a virtual volume management table. In this embodiment, the storage device B includes two data interfaces and three real volumes, but there can be any number of data interfaces and real volumes. Also, in the storage device B, the data interface IDs are d1, d2, and the volume IDs are vb1, vb2, and vb3.

FIG. 9 shows an example of the device detection list 13500 that is stored in the SAN management server 10000. Numbers arbitrarily assigned within the SAN management server are entered in the Detection ID field in FIG. 9. In the Device Type field, the type of the device in the SAN is entered. In the Device Information field, the vendor, the device name, and the like are entered. In the IP Address Information field, the IP address of each device in the management network 70000 is entered. The Volume Virtualization Function field indicates whether or not each device is equipped with the volume virtualization function. The Virtualization ID field is an entry in which a storage is entered in the form of device information. If a real volume of the storage device is virtualized from another device, the detection ID of the other device performing the virtualization is entered. This information is set up ahead of time by a SAN administrator using the output module 15000 and the input module 16000 of the SAN management server 10000. The SAN manager 13100 uses this list to identify and communicate with the management agent of each device.

FIG. 10 shows a sample data interface management table 23200 that is stored in the server A 20000. The Data Interface ID field in FIG. 10 stores the ID of the data interface of the server. The Port WWN (World Wide Name) field stores the Port WWN, which serves as a unique identifier within the Fibre Channel, assigned to the data interface. The SCSI ID field stores an identifier (SCSI ID number) of the SCSI target device to which the data interface connects.

FIG. 11 shows an example of the volume management table 23300 that is stored in the server A20000. The server A handles three volumes, and the server A uses the volume management table to store information about volumes that it is provided with. The LU (Logical Unit) ID field in the volume management table stores an arbitrarily assigned volume that the server A handles. The Data Interface ID field stores a data interface identifier in the server A used to access the volume. The SCSI ID field stores the SCSI ID number of the SCSI target device to which the data interface is connected. The LUN field identifies the SCSI logical unit for accessing the volume in the SCSI target device. The Volume Information field contains the vendor name, device name, and the volume identifier of the device providing the volume to the server.

In the example shown in FIG. 11, the server A is provided with the real volume va1 from the storage device A and the virtual volume vv1, whose real volume is located in the storage B, but which is virtualized by the storage device A. The server A is also provided with the real volume vb3 from the storage device B. The real volume vb3 of the storage device B is provided to the server A without being virtualized by the storage device A.

FIG. 12 shows an example of the FC connection management table 33200 that is stored in the switch A30000. The FC connection management table stores information relating to the connection targets s1 through s6, which are the data interfaces of the switch A30000. The Data Interface ID field of the FC connection management table stores the data interface IDs of the switch A30000. The Switch Port WWN field stores the Port WWN of the data interface. The Target Port WWN field stores the Port WWN for the data interface of the server or storage device to which the data interface connects.

FIG. 13 shows examples of the data interface management tables that are stored in the storage devices. The data interface management table 43200 is a table provided in the storage device A and the data interface management table 53200 is a table provided in the storage device B. The Data Interface Field of the data interface management table stores the identifier of a data interface in the storage device. The Port WWN field stores the Port WWN of the data interface.

FIG. 14 shows examples of the real volume management tables that are stored in storage devices. The real volume management table 43300 is in the storage device A, and the real volume management table 53300 is in the storage device B. The Real Volume ID field of the real volume management table stores the ID of a real volume in the storage device. The Path Availability field stores whether or not there is path available for use when another device accesses the real volume. The data interface ID field stores the identifier of-the data interface in the storage device used to access the volume. The SCSI IQ field stores the SCSI ID number assigned to the data interface. The SCSI LUN field stores the SCSI logical unit number used to access the real volume. If the Path Availability field for a real volume in the real volume management table indicates that there is no path, the real volume has not been used yet. Thus, the Data Interface ID field, the SCSI ID field, and the SCSI LUN field will all contain "N/A", indicating that these values have not been defined.

FIG. 15 shows an example of the virtual volume management table 43500 stored in the storage device A40000. First, the contents of the Virtual Volume fields will be described. The Virtual Volume ID field stores an arbitrarily assigned identifier for the virtual volume provided to the server. The Path Availability field stores an indication as to whether or not a path is available for use when another device accesses the virtual volume. The Data Interface field stores the identifier of the data interface in the storage device used to access the volume. The SCSI ID field stores the SCSI ID number assigned to the data interface. The LUN field stores the SCSI logical unit number used to access the real volume. In this embodiment, the storage device A 40000 provides the virtual volume vv1 by way of the data interface c1. The virtual volume vv2 is unused.

Next, the contents of the real volume fields in the virtual volume management table 43500 will be considered. The Real Data Interface ID field stores the identifier of the data interface of the storage device A used to access the real volume serving as the virtual volume indicated by the identifier in the Virtual Volume ID field. The SCSI ID field stores the SCSI ID number of the SCSI target device to which the real data interface is connected. The LUN field stores the SCSI logical unit number used to access the volume provided by the storage device by way of the real data interface. The Real Volume Information field stores the name of the storage device providing the real volume that is accessed by way of the real data interface and the identifier and storage capacity of this real volume. This information can be obtained using the SCSI INQUIRY command and the like.

The virtual volume management table 43500 stores data only for the volumes that are virtualized by a storage virtualization device (e.g., storage device A). Thus, the real volumes vb1, vb2, which are in the storage device B and can be accessed by the data interface c2 are entered in the virtual volume management table since they are recognized by the storage device A, virtualized by the storage device A, and provided to a server as virtual volumes. Since the real volume va1, which can be accessed by way of the data interface c1, is provided to the server without being virtualized by the storage device A, information relating to the real volume va1 is not entered in the virtual volume management table 43500. Information about the real volume vb3 in the storage device B is also not entered in the virtual volume management table 43500 since vb3 is directly recognized by the server A by way of the data interface d2. Thus, the virtualization devices supporting volume virtualization functions do not need to virtualize all real volumes in a storage device.

FIG. 16 shows examples of failure analysis dictionaries 13600 used in the SAN management server 10000. Example (a) in FIG. 16 is the failure analysis dictionary for the storage device A, Example (b) in FIG. 16 is for the storage device B, Example (c) in FIG. 16 is the failure analysis dictionary for the server A, and Example (d) FIG. 16 is the failure analysis dictionary for the switch A. These dictionaries are used to analyze SNMP Trap messages issued from a device when a failure or the like takes place. The details of this operation will be described later. The Failure Code field stores the failure code in the Variable Bindings field of an SNMP Trap message. The Failure Component field stores the failure component associated with the failure code. The Identifier field stores an identifier indicating the failure component. The Cause field stores the reason the message was issued. The Severity field stores the Severity of the Trap in the Specific Trap Type field of the SNMP Trap message.

FIG. 17 shows an example of a failure log 13700 provided in the SAN management server 10000. The failure log stores an event ID assigned when the SAN manager receives a failure notification message, a time when the failure took place, a device name for the source of the failure notification message, the failure code in the failure notification message, a real mapping ID for the mapping containing the component, a virtual mapping ID for the mapping containing the component, and relationships with other failure events.

FIG. 18 shows an example of a failure severity conversion table provided in the SAN management server 10000. In a failure notification operation, which includes a severity conversion function, performed by the SAN manager, as will be described later, this conversion table is used to define common severities for failure messages from multiple devices received by the SAN manager and to define the operations performed by the SAN manager in response to the common severities. This table is defined by a SAN administrator when setting up the SAN environment.

The failure severity conversion table stores a common severity for failure messages from multiple devices, the severities of each device corresponding to the common severity, and the operations performed by the SAN manager in response to the common severity. For example, in the case of FIG. 18, if the severity of the storage device A is "3" or if the severity is "4", "5", or "6" for the storage device B, the common severity is considered "3" in the SAN environment. In response, the SAN manager sends an SNMP Trap and an e-mail message to the SAN administrator containing failure message information relating to the storage device A only.

The severity conversion table is defined on the basis of the configuration of the SAN. For example, in the severity conversion table shown in FIG. 18, severity 3 for the storage A and severities 4–6 are associated with common severity 3, and common severity 3 is defined so that an SNMP Trap and an e-mail message to the SAN administrator are sent containing failure message information relating to the storage device A only. The reason for this is that the real volume in the storage B is virtualized by the storage device A and is provided to the server, with input/output requests sent between the storage B and the server going by way of the storage A. Thus, the definition links the severity of the storage A with the severity of the storage B and provides output only for the failure information of the storage A, which virtualizes the real volumes of storage A and storage B.

<Generation of Virtual Volume Mapping and Real Volume Mapping by the SAN Manager>

Next, the generation of virtual volume mapping and real volume mapping, as performed by the SAN manager 13100 of the SAN manager server 10000, will be described. This operation is performed periodically by having the processor 11000 of the SAN manager server 10000 execute a program that is stored in the memory 13000. In this operation, a current virtual volume mapping and real volume mapping for the SAN environment are generated and output. This will be used by the failure investigation operation and notification operation to be described later. Unless explicitly indicated, the steps described below are performed by the SAN manager 13100.

Figure 19:
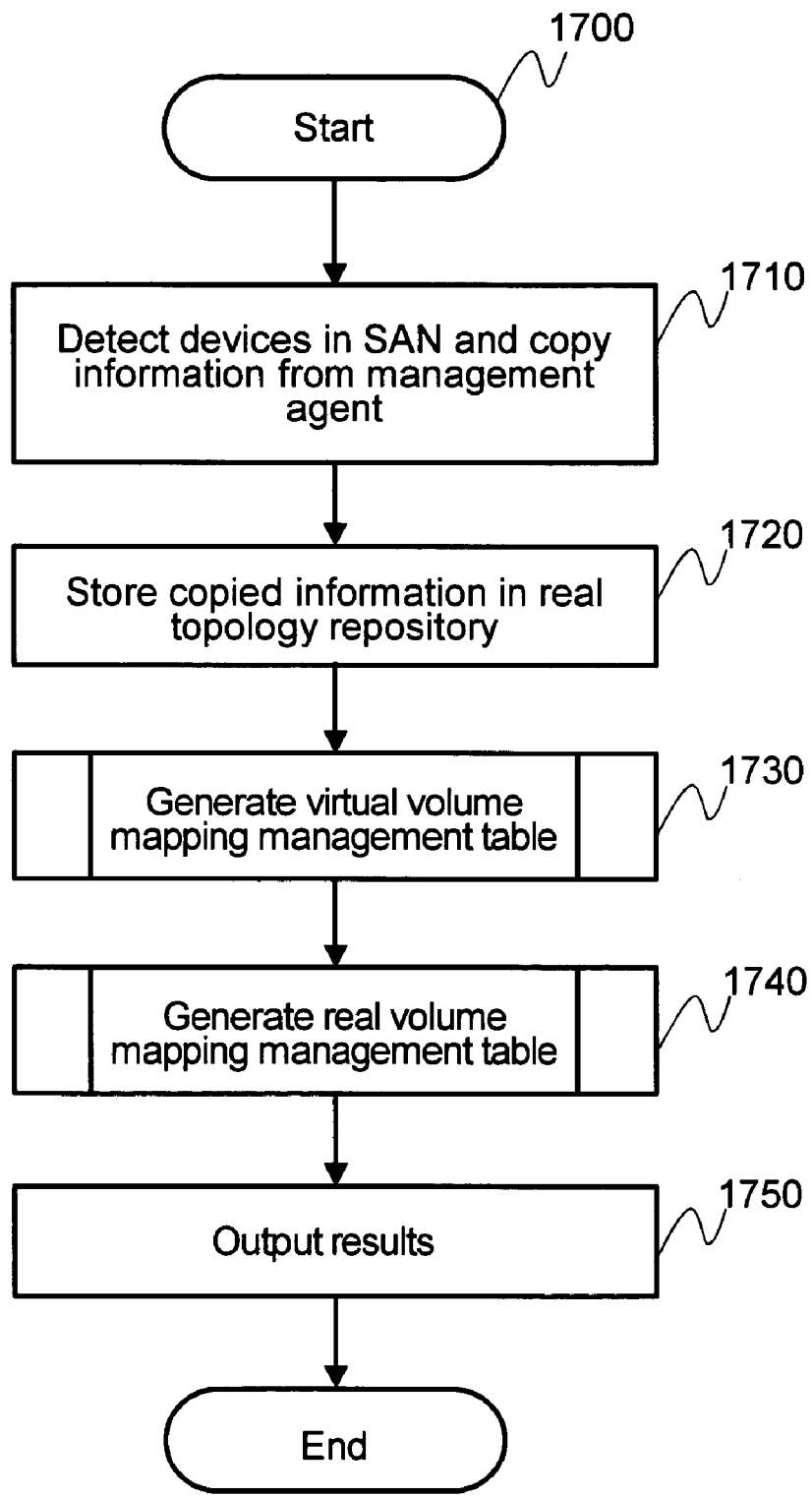
FIG. 19 is a flowchart showing an example of operations performed by a SAN management server to generate real topology mapping and virtual topology mapping for a storage network.

FIG. 19 is a flowchart 1700 presenting an overview of a real topology and virtual topology display operation that is executed by the SAN manager 13100. The SAN manager 13100 detects devices in the SAN based on the device detection list 13500, communicates with the management agent of each device, and copies the information stored in each device shown in FIG. 10 through FIG. 15 (step 1710). Next, the SAN manager 13100 stores the copied information in the real topology repository 13400 (step 1720). Then, using the information stored in step 1720, the virtual volume mapping table 13300 is generated (step 1730). Furthermore, the real volume mapping management table 13200, to be described later, is generated using the information in the real topology repository 13400 and the virtual volume mapping management table 13300 (step 1740). Finally, the results, such as the real topology, based on the contents of the virtual volume mapping management table 13300 and the real volume mapping management table 13200 are output (step 1750), and the operation is completed.

Figure 20:
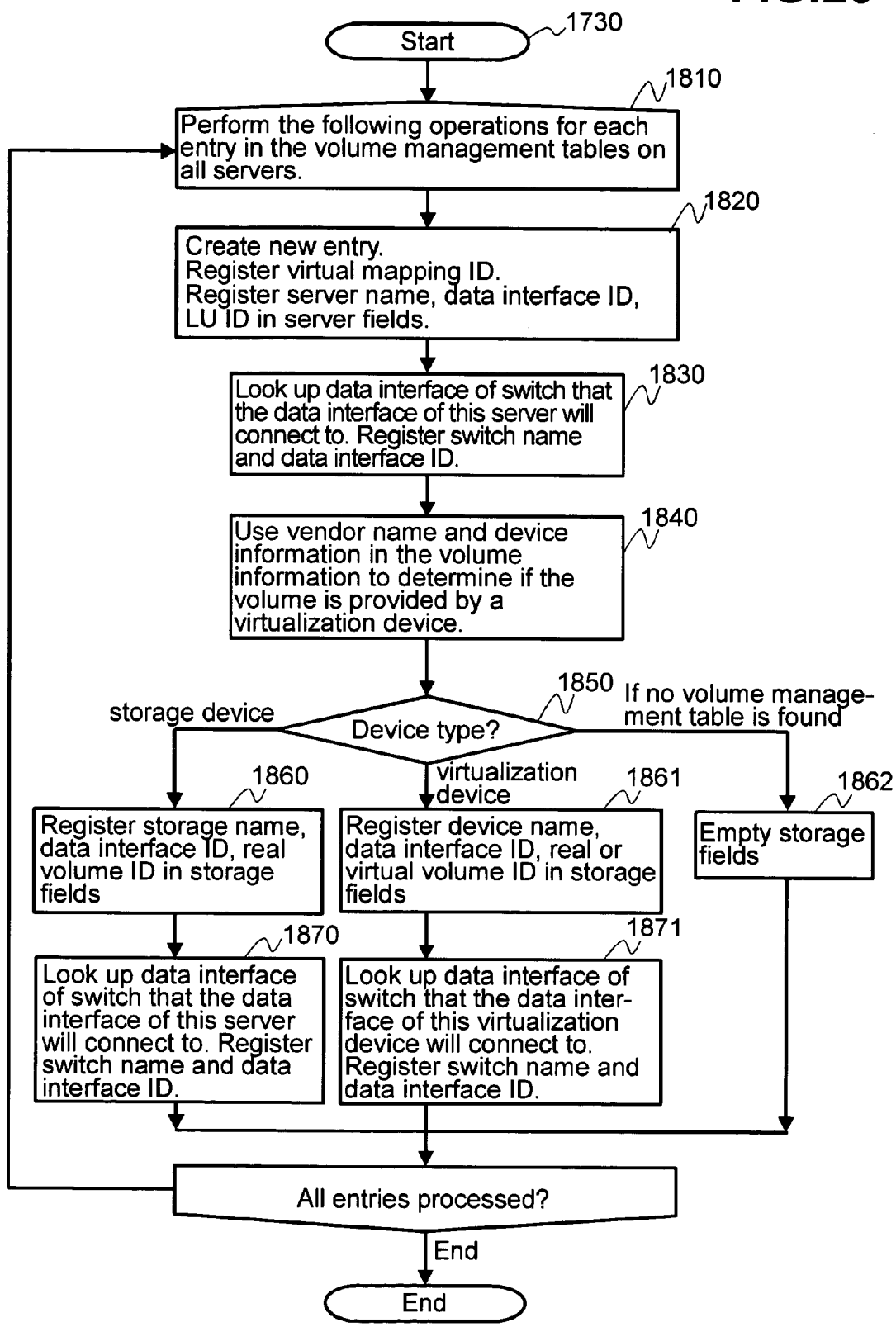
FIG. 20 is a detailed flowchart showing an example of operations performed by a SAN management server to generate a virtual volume mapping management table.

FIG. 20 is a flowchart showing the detailed operations performed by the SAN manager 13100 at the virtual volume mapping management table generation step 1730. FIG. 8 shows an example of the virtual volume mapping management table generated by the operation shown in FIG. 20. For each volume management table 23300 received from the servers and stored in the real topology repository 13400, the SAN manager 13100 performs the following operations on all the entries in the volume management table (step 1810).

First, the SAN manager generates a new entry in the virtual volume mapping management table and enters a newly allocated virtual mapping ID 13301. Then, the SAN manager enters a server name 13302 of the server that sent the volume management table 23300 being processed, a data interface ID 13304 stored in the volume management table, and a LU ID 13303 (step 1820). Next, the SAN manager checks the data interface of the switch to which the data interface 13304 is connected and enters a switch name 13305 and a data interface ID 13306.

More specifically, the SAN manager first uses the data interface 13304 of the server entered in the virtual volume mapping management table 13300 as a key to retrieve the Port WWN associated with the data interface ID in the data interface management table 23200 that was received from the server and stored in the real topology repository 13400. Then, the SAN manager uses this Port WWN as a key to look up the FC connection management table 33200 received from the switch A and stored in the real topology repository to determine which data interface of which switch the server is connected to. The result is entered as a target switch name and a target switch data interface ID 13306 (step 1830). As a result of this operation, information about the server is entered in the left half (server fields) of the virtual volume mapping management table 13300.

Next, the SAN manager performs operations to enter information in the right half of the virtual volume mapping management table 13300. The SAN manager uses the vendor name and the device name entered as volume information in the volume management table 23300 to determine if the volume entered in the volume management table is provided by a virtualization device. More specifically, the SAN manager determines if the device is equipped with the storage virtualization function by looking up the device detection list 13500 using the device information as a key. If the device is equipped with a virtualization function, it is assumed that the volume is provided from the virtualization device (step 1840). The operation branches in the following manner depending on the result from step 1840.

If the volume is provided by a storage device that is not a virtualization device, the SAN manager enters the device name and the volume ID from the volume information field in the volume management table 23300 as a storage name 13309 and a volume ID 13311 in the storage fields of the virtual volume mapping management table 13300. Then, the SAN manager obtains the ID of the data interface used to access the real volume by looking up the real volume management table received from the storage device using the entered volume ID 13311 as the key. The result is entered in the storage data interface ID 13310 (step 1860).

Then, the SAN manager checks the data interface of the switch to which the entered storage data interface 13310 is connected and enters the switch name and the data interface ID. More specifically, the SAN manager first determines the Port WWN of the storage data interface by looking up the data interface management table received from the storage device using the storage data interface ID 13310 as the key. Then, this WWN is used as a key to look up the FC connection management table 33200 received from the switch A to determine which data interface of which switch the storage data interface is connected to. Then, the SAN manager enters the results as a target switch name 13307 and a target switch data interface ID 13308 (step 1870).

If step 1850 determines that the volume is provided by a virtualization device, the SAN manager performs the following operations. First, the SAN manager takes the device name and the volume ID entered in the volume information field of the volume management able 23300 and enters them as a storage name 13309 and a volume ID 13311 in the virtual volume mapping management table 13300. Then, the SAN manager determines the ID of the data interface of the storage device A used to access the volume by looking up the virtual volume management able 43500 and the real volume management table 43300 received from the virtualization device using the volume ID 13311 that was entered as the key. The result is entered as the storage data interface ID 13310 (step 1861). Next, the data interface of the switch associated with the data interface of the storage device A is checked, and the switch name and data interface ID are entered.

More specifically, the SAN manager checks the data interface ID of the switch associated with the data interface by looking up the data interface management table 43200 received from the switch A using the storage data interface ID 13310 as the key. The results are then entered as the target switch name 13307 and the target switch data interface ID 13308 (step 1871).

Step 1850 cannot determine exceptional device types if the volume management table 23300 is not stored in the real topology repository 13400 because the device is not entered in the device detection list 13500, or if the device is not equipped with a management interface. If, in this manner, information is not entered in the volume information fields of the volume management table 23300, the storage fields are left empty (step 1862).

The operation at step 1730 is completed when the above steps have been executed by the SAN manager for all entries of all volume management tables received by the SAN management server from the servers and stored in the real topology repository 13400.

Figure 21:
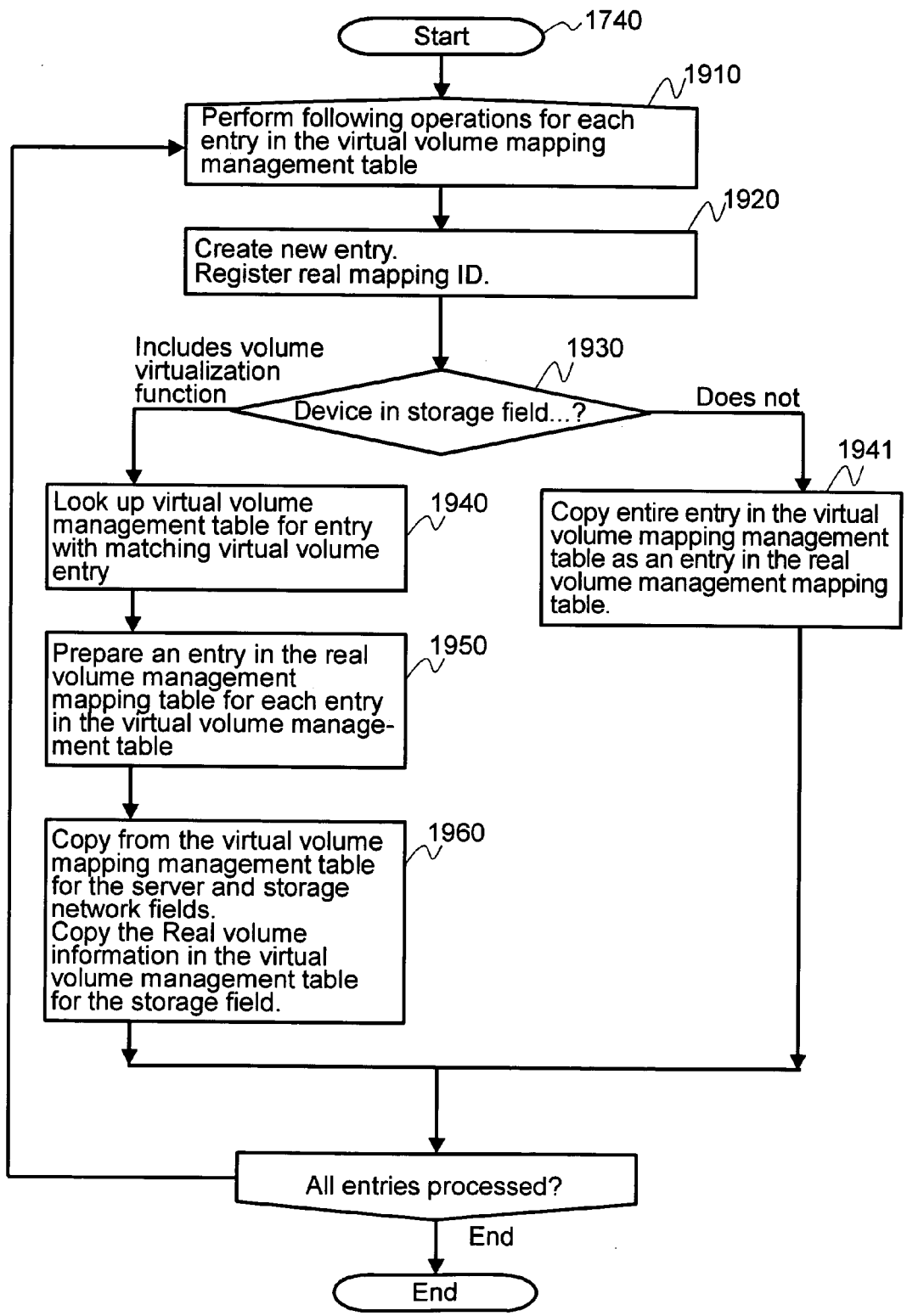
FIG. 21 is a detailed flowchart showing an example of operations performed by a SAN management server to generate a real volume mapping management table.

FIG. 21 shows the detailed flow of operations performed at the real volume mapping management table generation step 1740 by the SAN manager 13100. FIG. 7 shows an example of a real volume mapping management table generated by the operations shown in FIG. 21. The SAN manager 13100 executes the following operations for each of the entries in the virtual volume mapping management table 13300 generated at step 1730 (step 1910).

First, the SAN manager creates a new entry and enters a newly allocated real mapping ID 13201 (step 1920). Next, the SAN manager uses the storage names 13309 of the entries in the virtual volume mapping management table 13300 to determine if the device indicated by the storage name is equipped with the virtualization function. More specifically, the SAN manager looks up the device detection list 13500 using the storage name 13309 as the key and checks if the device has the virtualization function.

If the device has the virtualization function, the SAN manager performs the following steps. The SAN manager looks up the virtual volume management table 43500 received from the device indicated by the storage name 13309 using the volume ID 13311 in the virtual volume mapping management table entry as the key to retrieve entries with a virtual volume ID matching the volume ID 13311 (step 1940). Next, for each entry obtained in this manner, the SAN manager prepares a real volume management mapping table (step 1950).

Then, the SAN manager copies the server field contents (fields 13302 through 13306) of the current entry in the virtual volume mapping management table 13300 to the server fields (fields 13202 through 13206) of the newly prepared entries. The real data interface ID in the real volume information field of the entry in the virtual volume management table 43500 that was retrieved in step 1940 is copied to the switch data interface ID field 13208 of the storage fields. The storage name and the volume name in the real volume information field for the entry in the virtual volume management table 43500 is copied to the storage name entry 13209 and the volume ID entry 13211 in the storage fields.

The content of the virtual mapping ID 13301 in the virtual volume mapping management table 13300 is copied to the associated virtual mapping ID field 13212. The content of the switch name 13307 in the storage fields of the virtual volume mapping management table 13300 is copied to the switch name field 13207 in the storage fields (step 1960). The SAN manager then retrieves the ID of the data interface to which this volume is connected by looking up the real volume management table received from the storage device using the volume ID entered in the volume ID 13211 in the storage fields of the real volume mapping management table 13200. This ID is entered in the storage data interface ID 13210 in the storage fields of the virtual volume mapping management table 43500.

If it has been determined in step 1930 that there is no virtualization function, the SAN manager copies the current entry (fields 13302 through 13311) of the virtual volume mapping management table 13300 to the entry (fields 13202 through 13211) in the real volume mapping management table 13200. The entry in the virtual mapping ID 13301 in the virtual volume mapping management table 13300 is entered in the associated virtual mapping ID 13212 of the real mapping management table 13200.

The above-described operations fill entries 13201 through 13212 in the real volume mapping management table 13200. When the these steps have been executed by the SAN manager for all entries in the virtual volume mapping management table 13300, the operation indicated in step 1740 is completed.

Figure 23:
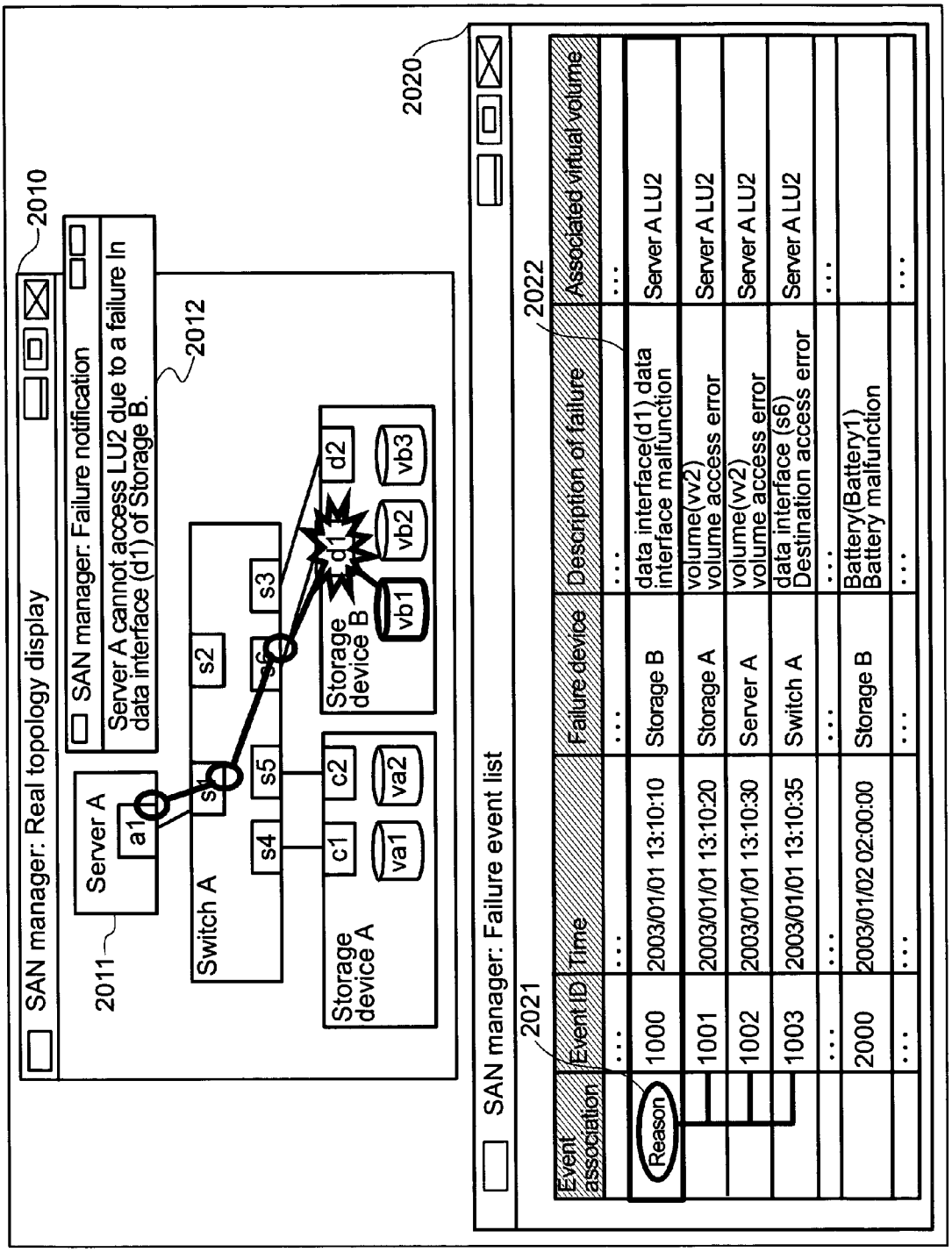
FIG. 23 is a diagram which shows a sample failure investigation results display that is output by a SAN management server.

FIG. 23 shows an example of a real topology display output to the output module 15000 by the SAN manager 13100 based on the real volume mapping table shown in FIG. 7. The real topology display 2010 is a sample output based on the real volume mapping management table 13200 indicating the connections between servers, switches, and storage devices.

<Failure Investigation Operation Performed by the SAN Manager>

An example of the failure investigation operation performed by the SAN manager will be described.

Currently, the failure monitoring functions performed by SAN management software often use SNMP protocol Trap messages defined in RFCI 157 ("A Simple Network Management Protocol (SNMP)") prepared by the IETF Internet Engineering Task Force). However, identifying the failure component down to the virtual volume level is difficult since the volumes allocated to the servers in virtual volume technology are virtualized. Also, having a SAN administrator investigate a failure requires the SAN administrator to have a high degree of knowledge about each device, thus making the administration costs extremely high.

In this operation, the SAN manager receives failure notifications from multiple devices and analyzes the effect these failures will have on real volume and virtual volume 1/0 accesses based on SAN configuration information that has been obtained from the management agents and is stored in the real topology repository. Also, relations between failure messages are determined. The SAN manager analyzes the failure messages received over a fixed period preceding the receipt of the current failure message to determine if there are any relationships with the current failure message. The results from this are output by the SAN manager so that the burden on the SAN administrator from analyzing multiple failure messages and investigating failures is reduced.

Before describing the failure investigation operation, the format, as shown in FIG. 25(*a*), of an SNMP Trap message received from devices in the SAN by the SAN manager will be described, and an example of an SNMP Trap message will be described with reference to FIG. 25(*b*). An SNMP Trap message is a failure notification message that is sent to the SAN management server 10000 by a management agent in a device in the SAN. FIG. 25(*a*) shows the format of an SNMP Trap message.

An SNMP message is formed from: a message header; a community name field for the message destination; a PDU (Protocol Data Unit) Type field indicating the message type; an Enterprise field indicating the name of the sending device vendor; an Agent Address indicating the source IP address; a Generic Trap Type field indicating the type of the Trap message; a Specific Trap Type field indicating the specific code uniquely defined by the sending device vendor; a Timestamp field indicating the time at which the message was sent; and a Variable Bindings field for storing the contents of the message uniquely defined by the sending device vendor. A PDU Type field value of "4" indicates that the message is an SNMP Trap message. A Generic Trap Type field value of "6" indicates that the Trap message is based on a vendor-specific definition of the sending device vendor. In such cases, the Trap message must be interpreted based on the individual vendor definition.

FIG. 25(*b*) shows an example, according to this embodiment, of an SNMP Trap message sent by the storage A 40000 to provide notification of a hardware failure in its own hardware. The message shown in FIG. 25(*b*) is recognized as an SNMP Trap message since the PDU Type is "4". The message is recognized as a Trap message based on vendor-specific definitions of the sending device vendor since the Generic Trap Type is "6". In this case, the Specific Trap Type field is defined by the vendor to contain the Severity of the failure and the Variable Bindings field to contain a failure code indicating the failure component. Thus, the SNMP Trap message in FIG. 25(*b*) indicates that a failure has taken place with Severity of "1" and a failure code of "30c1 ".

Figure 22:
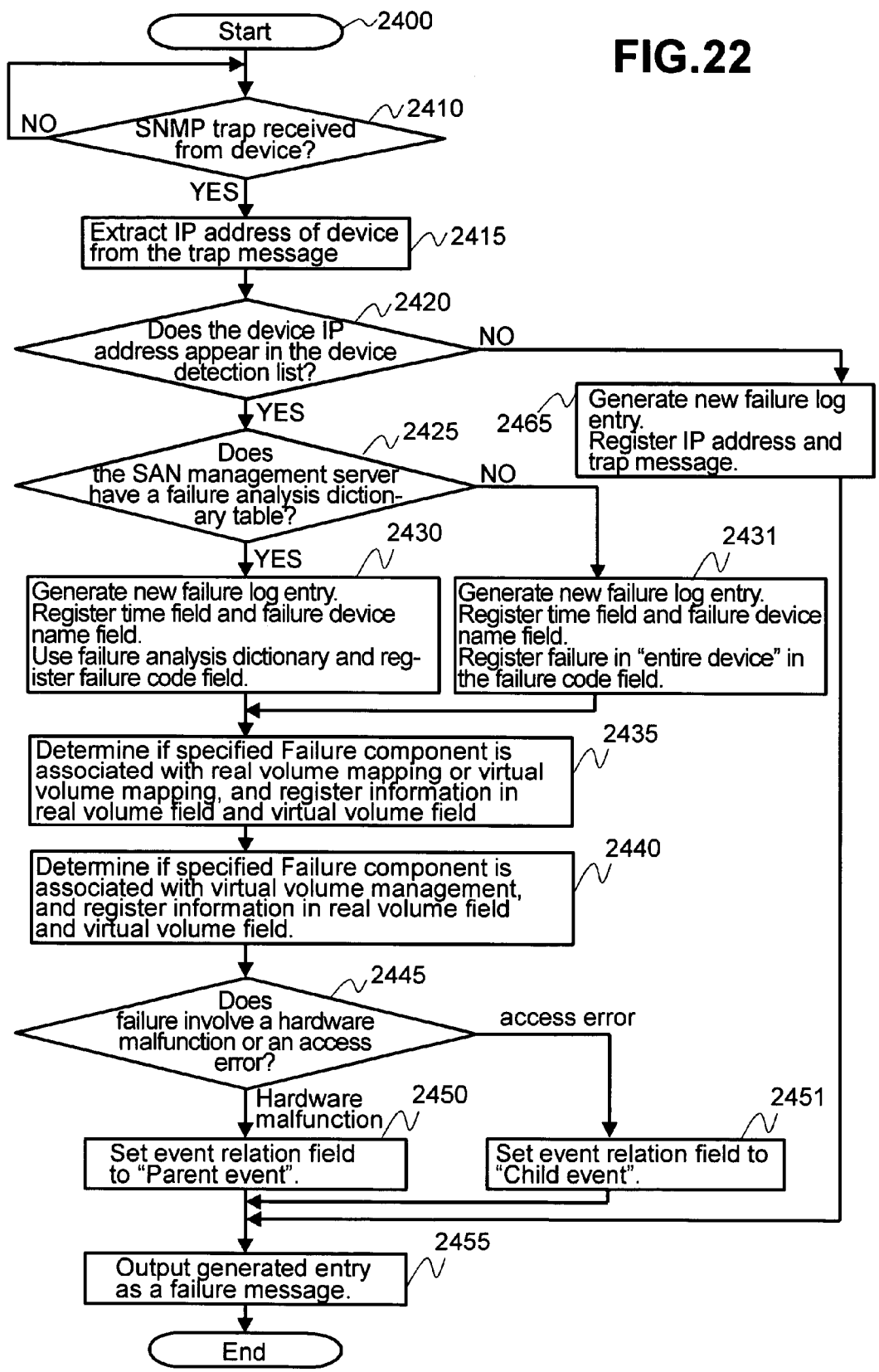
FIG. 22 is a flowchart showing an example of operations performed by a SAN management server to investigate failures.

FIG. 22 is a flowchart illustrating an example of a failure investigation operations 2400 performed by the SAN manager 13100 in the SAN management server 10000. Unless explicitly indicated otherwise, the steps described below are executed by the SAN manager 13100.

The SAN manager 13100 waits until an SNMP Trap message is received from a device (step 2410). When a message is received, the SAN manager extracts the IF address of the device sending the message from the Agent Address field in the message (step 2415). The extracted IP address is used as a key to look up the device detection list 13500 stored in the real topology repository 13400 (step 2420).

If the IP address is not found in the device detection list 13500, it is apparent that the Trap message has been received from an unregistered device, and, therefore, the SAN manager cannot analyze the contents of the Trap message. Thus, the SAN manager creates a new entry in the failure log 13700, assigns an event ID, and outputs the IP address as an indication of the failure device and the Trap message itself as an indication of the failure component (step 2465). Control then jumps to step 2455, to be described later.

If, at step 2420, the extracted IP address was found in the device detection list 13500 and the device issuing the Trap message could be identified, the SAN manager checks to see if the SAN manager server 10000 is equipped with a failure analysis dictionary for the device (step 2425).

If a failure analysis dictionary is available at step 2425, the SAN manager creates a new entry in the failure log 13700, assigns an event ID, extracts the failure time from the Timestamp field in the message and enters it in the time field, and also enters the device name. Then, the failure analysis dictionary is looked up using the Variable Bindings field of the Trap message as the key. If the failure code is found, the failure code is entered in the failure code field (step 2430).

If, at step 2425, a failure analysis dictionary is not available, the SAN manager creates a new entry in the failure log 13700, assigns an event ID, extracts the failure time from the Timestamp field in the message, enters it into the time field, and also enters the device name. Then, the SAN manager assumes that the failure component is the entire device, enters "entire device" in the failure code field, and continues on with the following steps (step 2431).

When step 2430 or step 2431 has been completed, the SAN manager determines if the failure component indicated by the failure code is associated with real volume mapping or virtual volume mapping (step 2435). More specifically, the failure code is used as a key to retrieve the failure component and its identifier from the entry in the failure analysis dictionary for the registered failure device name. Next, the failure device name and the failure component ID or the failure component obtained previously are used as keys to determine if there is a matching entry in the real volume-mapping management table 13200. If there is a matching entry, the SAN manager extracts the real mapping ID 13201 and the virtual mapping ID 13212 from the entry and enters these into the real volume field and the virtual volume field in the entry being created in the failure log 13700.

Then, the SAN manager determines if the indicated failure component is associated with virtual volume management (step 2440). More specifically, the failure component ID or the failure component and the failure device retrieved at step 2435 are used as keys to see if there is a matching entry in the virtual volume management table 43500. If there is a matching entry, the SAN manager extracts a virtual volume ID from the entry. Then, the extracted virtual volume ID is used as a key to see if there is a matching entry in the real volume mapping management table 13200. The real mapping ID 13201 and the virtual mapping ID 13212 are extracted and entered in the real volume field and the virtual volume field in the entry being created in the failure log 13700.

After the relationship between the current entry in the failure log and real volume mapping and virtual volume mapping has been entered at step 2435 and step 2440, the SAN manager looks into relationships with other failure log entries. First, the SAN manager determines if the entry being created is for a hardware failure or an access error to another component (step 2445). More specifically, the failure code is used as a key to retrieve the reason for the failure in the failure analysis dictionary for the entered failure device name.

If the reason determined at step 2445 is a hardware failure, the event being created is assumed to be a "parent" event that may induce other failure events, and "parent event" is entered in the event relationship field (step 2450). If the reason found at step 2445 is an access error to another component, the event being created is assumed to be a "child event" that may have been issued due to another failure event, and "child event" is entered in the event relationship field (step 2451).

Finally, the contents of the new failure log entry are output by the SAN manager as a failure message (step 2455). This concludes the description of the flowchart 2400. A specific example of a failure investigation operation 2400 shown in the flowchart as performed by the SAN manager 1300 will be described. FIG. 23 shows an example of how the failure log shown in FIG. 17 is output by the failure investigation operation 2400 shown in the flowchart of FIG. 22. Event IDs 1000, 1001, 1002, 1003 are four failure messages generated due to a hardware malfunction in the data interface 56000 having the ID d1 of the storage device B 50000. How these four messages are analyzed and associated will be described.

When the failure message with the event ID 1000 is received, the SAN manager analyzes the event as a hardware malfunction in the data interface 56000 having the ID d1 of the storage device B 50000 at step 2430. Then, at step 2435, the SAN manager finds that there are relationships with the real volume mapping pm2 and the virtual volume mapping vm2. At step 2445, it is further determined that the hardware malfunction is a "parent event".

Next, when the failure message with the event ID 1001 is received, at step 2430 the SAN manager analyzes the event as an access error from when an I/O operation to the virtual volume vv1 in the storage device A was extended to the real volume vb1. Then, at step 2435, the SAN manager finds that there are relationships with the real volume mapping pm2 and the virtual volume mapping vm2. Then, at step 2445, the access error is determined to be a "child event". In a similar manner, the failure message with the event ID 1002 and the failure message with the event ID 1003 are determined to be "child events".

When outputting the failure message at step 2455, the SAN manager looks at the real volume fields, the virtual volume fields, and the event relationship fields of the failure messages issued over a fixed period to determine if there are any associations with these failure messages. If so, an identification is made as either "parent event" or "child event". The "fixed period" referred to here is a time interval specified by the SAN administrator and serves as a time unit used in associating failures. The event IDs 1000, 1001, 1002, 1003 in FIG. 17 are all associated with the real volume mapping pm2 and the virtual volume mapping vm2, and since it is also known that the event ID 1000 is a "parent event", these associations can be indicated in the failure event list window 2020 shown in FIG. 23, e.g., with a symbol 2021 in the event association field.

Also, as in event specification 2022, if the SAN administrator specifies a particular failure event, the SAN manager 10000 can graphically represent the real topology mapping associated with the specified event in the real topology display window 2010, e.g., as in the real topology mapping display 2011. Furthermore, the contents of the specified event can be displayed in a manner that is easy to understand, as in the failure notification window 2012.

Thus, by performing the failure investigation operation, the SAN manager can respond to failure messages from multiple devices in the SAN by analyzing the failure messages and automatically associating these messages with other failure messages, thereby reducing the burden on the SAN administrator of investigating failures.

<Failure Notification Operations Performed by the SAN Manager, Including Severity Conversion>

An example of failure notification operations, including severity conversion, as performed by the SAN manager, will be described. In this operation, the SAN manager supports a severity conversion function for multiple storage devices connected to virtualization devices. Failure severity conversion table definitions defined by the SAN administrator ahead of time are used so that when a failure message is received, a high-level management program or an administrator is notified according to a common severity defined in the conversion table.

Figure 24:
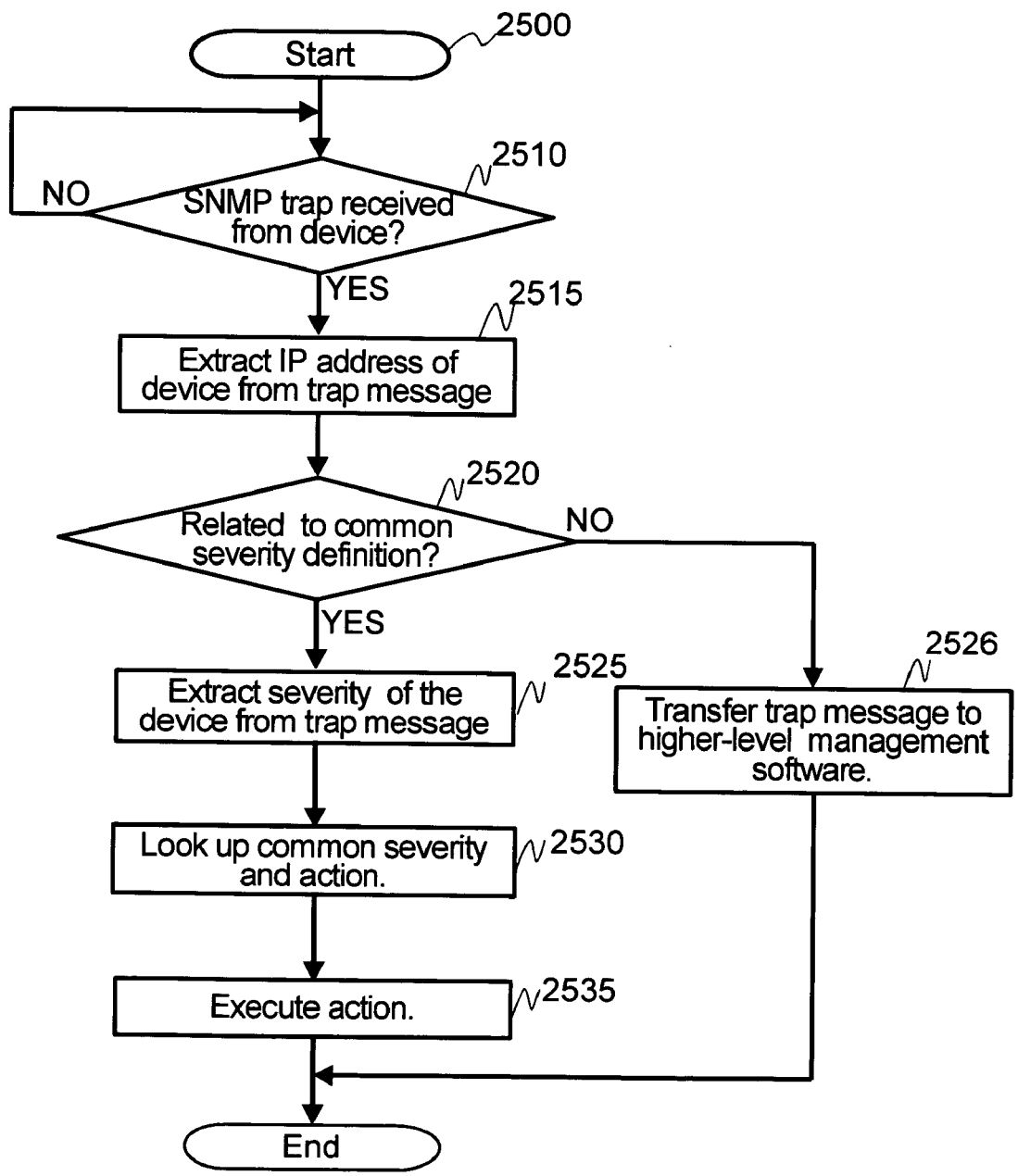
FIG. 24 is a flowchart showing an example of failure notification operations including a severity conversion function performed by a SAN management server.

FIG. 24 shows a flowchart illustrating failure investigation operations 2500 performed by the SAN manager 13100 in the SAN management server 10000. Unless explicitly stated otherwise, the following steps are executed by the SAN manager 13100.

The SAN manager 13100 waits for an SNMP Trap message to be received from a device (step 2510). When a message is received, the SAN manager extracts the IP address of the device issuing the message from the Agent Address field in the message (step 2515).

Using the extracted IP address, the SAN manager determines if the device issuing the message is associated with the common severity definition (step 2520). More specifically, first the source of the message is identified by checking the device detection list 13500 to see if it contains the extracted IF address. Next, the failure severity conversion table 13800 is checked to see if there is a severity field associated with the identified device.

If, at step 2520, the device issuing the message is found to be not associated with the common severity definition, the SAN manager does not perform severity conversion and transfers the Trap message directly to the high-level management software (step 2526).

If, at step 2520, the device issuing the message is found to be associated with the common severity definition, the severity of the device issuing the message is extracted from the Specific Trap Type field in the SNMP Trap message (step 2525). The failure severity conversion table 13800 is looked up using the name of the device issuing the message and the extracted severity, and a common severity and an action are identified (step 2530). Finally, the action identified at step 2530 is executed (step 2535). This concludes the operations 2500 performed in the flowchart 2500.

A specific example of a failure notification operation 2500 performed by the SAN manager 10000 according to the flowchart of FIG. 24 will be described. In this example, an event with the event ID 2000 from the failure log shown in FIG. 17 is received. Step 2515 determines that the failure message with the event ID 2000 was sent by the storage device B, so at step 2520 it is determined that it is associated with the common severity definition. At step 2525, since the severity in the Trap message is "4", the action "Send storage A information as trap and e-mail" applies, and the failure message with the event ID 2000 is not sent to the high-level management software or the SAN administrator.

Thus, the SAN manager performs the notification operation, including the severity conversion function, to provide a unified severity definition for failure messages received by the SAN manager from multiple storage devices, and the SAN manager can provide a failure notification function based on this definition.

The operation for creating the real topology mapping and virtual topology mapping for the storage network, the operation for investigating failures, and the operation for failure notification including severity conversion performed by the SAN manager all are based on the assumption that the storage device A 40000 is a virtualization device. However, the above operations can also be implemented in a configuration where a device other than the storage device A 40000 is a virtualization device that is connected to the management network 70000 and the SAN 60000.

With the embodiment described above, in a SAN equipped with a virtualization device, a device executing a SAN manager can receive failure messages from multiple devices in the SAN so that the SAN manager analyzes the failure messages and associates them with other failure messages in an automated manner, thus reducing the burden on the SAN administrator for investigating failures.

By defining unified severities for failure messages received by the SAN manager in a SAN from multiple storage devices and having the SAN manager perform failure notification based on these definitions, the SAN administrator and the high-level system management software can receive just the necessary failure information. This speeds up responses to failures after notification.

According to the present invention, when a failure message is issued from a device connected to the SAN, support for failure investigation can be provided to the SAN administrator.

Also, in the SAN, the SAN administrator and the high-level system management software can receive just the necessary failure information out of the failure messages issued from the devices in the SAN.

What is claimed is:

1. In a system including a storage device, equipped with a real volume, a virtualization device coupled to said storage device by way of a network and managing a virtual volume which is related to said real volume of said storage device, and a management server coupled to said storage device and said virtualization device by way of a management network, a method for managing failure information comprising:
    a failure notification step in which said management server receives a first failure notification related to said virtual volume from said virtualization device and a second failure notification related to said real volume from said storage device;
    an associating step in which said management server associates said first failure notification and said second failure notification based on relationship information between said real volume and said virtual volume; and
    a failure message outputting step for outputting results indicating that said first and second failure notifications are associated.

2. A method for managing failure information as described in claim 1, wherein said associating step includes a step of associating said first and second failure notifications if said first and second failure notifications are issued within a fixed time interval.

3. A method for managing failure information as described in claim 1, further comprising:
    receiving, in said management server, configuration information about said network from a device coupled to said network; and
    associating said first and second failure notifications based on said relationship information between said real volume and said virtual volume and said configuration information.

4. A method for managing failure information as described in claim 1, wherein:
    said associating step includes a step of identifying a causal relationship between said first and second failure notifications based on said relationship information between said real volume and said virtual volume; and
    said outputting step includes a step of displaying said identified causal relationship.

5. A method for managing failure information as described in claim 4, wherein said step of identifying causal relationship includes:
    identifying, out of said first and second failure notifications, a hardware failure notification notifying a hardware malfunction as a failure and an access failure notification notifying an access error as a failure issued under influence of said hardware malfunction.

6. A method for managing failure information as described in claim 1, further comprising:
    receiving, in said management server, a first severity information contained in said first failure notification, indicating a severity of failure based on a first standard,
    receiving, in said management server, a second severity information contained in said second failure notification, indicating severity of failure based on a second standard,
    converting said first and second severity information to a third severity information based on a common standard; and
    outputting, by said management server, failure information based on said third severity information.

7. A method for managing failure as described in claim 1, wherein the relationship information, stored in the memory, includes information of a logical unit number of said virtual volume and its corresponding logical unit number of said real volume.

8. A method for managing failure as described in claim 7, wherein said first failure notification includes first information regarding said logical unit number of said virtual volume and said second failure notification includes second information regarding said logical unit number of said real volume.

9. A method for managing failure as described in claim 1, wherein said first failure notification includes first information regarding a logical unit number of said virtual volume and said second failure notification includes second information regarding a logical unit number of said real volume.

10. A management server coupled by way of a management network to a storage device including a real volume and a virtualization device coupled by way of a network to said storage device, said virtualization device providing a virtual volume by using said real volume in said storage device, said management server comprising:
    an interface control module coupled to said management network;
    a processor coupled to said interface control module;

a memory, coupled to said processor, which stores a program executed by said processor and information used by said processor; and an output module, coupled to said processor, which outputs processing results from operations executed by said processor, wherein said interface control module receives a plurality of failure notifications from said storage device and said virtualization device, said processor associates a first failure notification of said plurality of failure notifications indicating an error of said virtual volume with a second failure notification of the plurality of failure notifications indicating an error of said real volume based on relationship information, stored in the memory, between said real volume and said virtual volume; and said output module outputs results from said processor indicating that said first and second failure notifications are associated.

11. A management server as described in claim 10, wherein said processor associates said first and second failure notifications if said first and second failure notifications are issued within a fixed time interval.

12. A management server as described in claim 10, wherein:

said interface control module receives configuration information about said network from a device coupled to said network; and said processor associates said first and second failure notifications based on said relationship information between said real volume and said virtual volume and said configuration information.

13. A management server as described in claim 10, wherein:

said processor identifies a causal relationship between said first and second failure notifications based on said relationship information between said real volume and said virtual volume; and said output module outputs said identified causal relationship.

14. A management server as described in claim 13, wherein:

said processor identifies, out of said first and second failure notifications, a hardware failure notification indicating a hardware malfunction and an access failure notification indicating an access error issued under influence of said hardware malfunction.

15. A management server as described in claim 10, wherein:

said processor receives a first severity information contained in said first failure notification, indicating severity of failure information based on a first standard, and a second severity information contained in said second failure notification, indicating severity of failure information based on a second standard, and converts said first and second severity information to a third severity information based on a common standard; and said output module outputs failure information based on said third severity information.

16. A management server as described in claim 10, wherein the relationship information, stored in the memory, includes information of a logical unit number of said virtual volume and its corresponding logical unit number of said real volume.

17. A management server according to claim 16, wherein said first failure notification includes first information regarding said logical unit number of the said virtual volume and said second failure notification includes second information regarding said logical unit number of said real volume.

18. A management server according to claim 10, wherein said first failure notification includes first information regarding a logical unit number of the said virtual volume and said second failure notification includes second information regarding a logical unit number of said real volume.

19. A management server according to claim 10 further comprising a display device coupled to said processor, wherein the processor outputs the results to the display device, and wherein the display device displays the results.

20. In a system comprising a computer, a virtualization device coupled to the computer, a plurality of storage systems coupled to the virtualization device, and a management computer coupled to the plurality of storage systems and the virtualization device, the management computer comprising:

an interface coupled to the plurality of storage systems and the virtualization device; and a processor coupled to the interface, wherein the processor receives volume information from the plurality of storage systems and virtual volume information from the virtualization device via the interface, wherein the volume information includes configuration information of a plurality of volumes constructed in the plurality of storage systems, and the virtual volume information includes configuration information of a plurality of virtual volumes in the virtualization device related to a one or some of the plurality of volumes, wherein the processor receives a first error notification from the virtualization device and a second error notification from a one of the plurality of storage systems via the interface, wherein the processor identifies whether or not an issuance of the second error notification causes an issuance of the first error notification based on a relationship between the volume information and the virtual volume information, and, if the issuance of the second error notification causes the issuance of the first error notification, outputs first information indicating that a first failure notified by the second error notification is a causal error of the first error notification.

21. A management computer according to claim 20, wherein, if the issuance of the second error notification does not cause the issuance of the first error notification, the processor outputs second information indicating that the first failure and a second failure notified by the first error notification are independent of each other.

22. A management computer according to claim 21, wherein, if the failure is a hardware error of the one of the plurality of storage systems and the second failure is an access error between the one of the plurality of storage systems and the virtualization device, the processor identifies that the issuance of the second error notification causes the issuance of the first error notification.

23. A management computer according to claim 22, wherein, if the second failure is a hardware error of the virtualization device, the processor identifies that the issuance of the second error notification does not cause the issuance of the first error notification.

24. A management computer according to claim 23, wherein the first and second error notification are sent by using SNMP protocol.

25. A management computer according to claim 20, wherein said first error notification includes first information regarding a logical unit number of said plurality of virtual volumes and said second error notification includes second information regarding a logical unit number of said plurality of volumes.

26. In a system having a computer, a virtualization device coupled to the computer, a plurality of storage systems coupled to the virtualization device, and a management computer coupled to the plurality of storage systems and the virtualization device, the management computer comprising:

a processor; and an interface coupled to the plurality of storage systems, the virtualization device and the processor, wherein the processor receives volume information from the plurality of storage systems and virtual volume information from the virtualization device via the interface, wherein the volume information includes configuration information of a plurality of volumes constructed in the plurality of storage systems and the virtual volume information includes configuration information of a plurality of virtual volumes, in the virtualization device, associated with a one or some of the plurality of volumes, wherein the processor receives a first notification from the virtualization device and a second notification from a one of the plurality of storage systems via the interface, wherein the first notification indicates a first failure of a first virtual volume of the plurality of virtual volumes and the second notification indicates a second failure of the one of the plurality of storage systems which includes a first volume of the plurality of volumes, wherein the processor identifies whether the first virtual volume is related to the first volume or not based on the virtual volume information and the volume information, wherein, if the first virtual volume is related to the first volume, the processor identifies whether or not the second failure causes issuance of the first notification, and, if the second failure causes the issuance of the first notification, outputs information indicating that the second failure is a causal error of the first notification.

27. A management computer according to claim 26, wherein, if the second failure is a hardware error of the one of the plurality of storage systems and the first failure is an error of accessing the first virtual volume, the processor identifies that the second failure causes the issuance of the first notification.

28. A management computer according to claim 26, wherein, if the first failure is a hardware error of the virtualization device, the processor identifies that the second failure does not cause the issuance of the first notification.

29. A management computer according to claim 28, wherein the first and second notification are sent by using SNMP protocol.

30. A management computer according to claim 26, wherein said first notification includes first information regarding a logical unit number of said first virtual volume and said second notification includes second information regarding a logical unit number of first volume.

31. In a system comprising a computer, a virtualization device coupled to the computer, a plurality of storage systems coupled to the virtualization device, and a management computer coupled to the plurality of storage systems and the virtualization device, the virtualization device providing a virtual volume to the computer, the management computer comprising:

an interface, coupled to the plurality of storage systems and the virtualization device, configured to receive volume information from the plurality of storage systems and virtual volume information from the virtualization device, and to receive a first error notification from the virtualization device and a second error notification from a one of the plurality of storage systems, the volume information which includes configuration information of a plurality of volumes constructed in the plurality of storage systems, and the virtual volume information which includes configuration information of a plurality of virtual volumes in the virtualization device related to a one or some of the plurality of volumes; and a processor, coupled to the interface, configured to identify whether or not an issuance of the second error notification causes an issuance of the first error notification based on a relationship between the volume information and the virtual volume information, and, if the issuance of the second error notification causes the issuance of the first error notification, output information indicating that a failure notified by the second error notification is a causal error of the first error notification so that a display device is capable to display a real error based on a received notifications.

32. A management computer according to claim 31, wherein said first error notification includes first information regarding a logical unit number of said plurality of virtual volumes and said second error notification includes second information regarding a logical unit number of said plurality of volumes.

33. In a system comprising a computer, a virtualization device coupled to the computer, a plurality of storage systems coupled to the virtualization device, and a management computer coupled to the plurality of storage systems and the virtualization device, the virtualization device providing virtual volume to the computer, the management computer comprising:

an interface, coupled to the plurality of storage systems and the virtualization device, configured to receive volume information from the plurality of storage systems, virtual volume information from the virtualization device, a first notification from the virtualization device and a second notification from a one of the plurality of storage systems, the volume information which includes configuration information of a plurality of volumes constructed in the plurality of storage systems and the virtual volume information which includes configuration information of a plurality of virtual volumes, in the virtualization device, related to a one or some of the plurality of volumes, the first notification which indicates a first failure of a first virtual volume of the plurality of virtual volumes and the second notification which indicates a second failure of the one of the plurality of storage systems which includes a first volume of the plurality of volumes;

a processor, coupled to the interface, configured to identify whether or not the first virtual volume is related to the first volume based on the virtual volume information and the volume information, to identify whether or not the second failure causes issuance of the first notification if the first virtual volume is related to the first volume, and to output information indicating that the second failure is a causal error of the first notification if the second failure causes the issuance of the first notification; and a display device, coupled to the processor, configured to display the information that is output.

34. A management computer according to claim 33, wherein said first notification includes first information regarding a logical unit number of said first virtual volume and said second notification includes second information regarding a logical unit number of first volume.

* * * * *

UNITED STATES PATENT AND TRADEMARK OFFICE
CERTIFICATE OF CORRECTION

PATENT NO. : 7,076,688 B2
APPLICATION NO. : 10/659362
DATED : July 11, 2006
INVENTOR(S) : M. Yamamoto et al.

Page 1 of 1

It is certified that error appears in the above-identified patent and that said Letters Patent is hereby corrected as shown below:

ON THE TITLE PAGE

Please correct item (73) Assignee: to read as follows:

(73) Assignee: <u>Hitachi, Ltd.</u>, Tokyo (JP)

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,076,688 B2
APPLICATION NO. : 10/659362
DATED : July 11, 2006
INVENTOR(S) : M. Yamamoto et al.

It is certified that error appears in the above-identified patent and that said Letters Patent is hereby corrected as shown below:

ON THE TITLE PAGE

Please correct Item (75) Inventor: to read as follows:

(75) Inventor<u>s</u>:  Masayuki Yamamoto, Sagamihara (JP)
<u>Takashi Oeda, Sagamihara (JP)</u>

Signed and Sealed this

Twenty-seventh Day of May, 2008

JON W. DUDAS
*Director of the United States Patent and Trademark Office*